(12) United States Patent
Nash et al.

(10) Patent No.: US 8,788,402 B2
(45) Date of Patent: Jul. 22, 2014

(54) SYSTEMS AND METHODS FOR RESIDENTIAL REAL ESTATE RISK TRANSFERENCE VIA ASSET-BACKED CONTRACT

(71) Applicant: EKCS, LLC, San Diego, CA (US)

(72) Inventors: Jeffrey Nash, San Diego, CA (US); Eduardo Lombardi, San Diego, CA (US); Derek Myron, Solana Beach, CA (US)

(73) Assignee: EKCS, LLC, San Diego, CA (US)

( * ) Notice: Subject to any disclaimer, the term of this patent is extended or adjusted under 35 U.S.C. 154(b) by 0 days.

(21) Appl. No.: 14/030,997

(22) Filed: Sep. 18, 2013

(65) Prior Publication Data

US 2014/0095372 A1  Apr. 3, 2014

Related U.S. Application Data

(60) Provisional application No. 61/707,317, filed on Sep. 28, 2012.

(51) Int. Cl.
*G06Q 40/00* (2012.01)
*G06Q 40/04* (2012.01)

(52) U.S. Cl.
CPC .................................... *G06Q 40/04* (2013.01)
USPC .......................................................... 705/37

(58) Field of Classification Search
CPC ................................................... G06Q 40/04
USPC ............................................. 705/35, 37, 38
See application file for complete search history.

(56) References Cited

U.S. PATENT DOCUMENTS

| | | | |
|---|---|---|---|
| 8,510,190 B1* | 8/2013 | Graff et al. ...................... | 705/35 |
| 2002/0042770 A1* | 4/2002 | Slyke et al. ..................... | 705/37 |
| 2004/0158515 A1* | 8/2004 | Schoen .......................... | 705/35 |
| 2005/0021453 A1* | 1/2005 | Lyman ........................... | 705/38 |
| 2005/0075961 A1* | 4/2005 | McGill ........................... | 705/35 |
| 2005/0108029 A1* | 5/2005 | Schneider ....................... | 705/1 |
| 2006/0015364 A1* | 1/2006 | Hays ............................... | 705/1 |
| 2006/0080228 A1* | 4/2006 | McGill et al. ................... | 705/38 |
| 2006/0089895 A1* | 4/2006 | Joye et al. ....................... | 705/35 |

(Continued)

OTHER PUBLICATIONS

Equitykey, "Overview," Nov. 17, 2011, https://web.archive.org/web/20111117141743/http://www.equitykey.com/product-overview/overview, pp. 1-2.*

(Continued)

*Primary Examiner* — Kenneth Bartley
(74) *Attorney, Agent, or Firm* — Pillsbury Winthrop Shaw Pittman LLP

(57) ABSTRACT

Real estate risk may be transferred via a contract associated with a real estate property. Such a contract may be an asset-backed index swap or an investment contract in which an owner entity of the real estate property grants to an investor entity an economic right to a portion of future appreciation of the real estate property in exchange for consideration. The contract may expire responsive to a transfer of title of the real estate property. Exemplary implementations may provide a way to slice off the growth component of the property to an investor who wants it yet leaves the utility value and existing equity squarely in the hands of the homeowner. This division of growth and utility components may allow the homeowner to sell just the growth component of the property—and do so at a lower price in exchange for the convenience and liquidity tendered.

30 Claims, 32 Drawing Sheets

(56) References Cited

U.S. PATENT DOCUMENTS

| | | | |
|---|---|---|---|
| 2006/0116942 A1* | 6/2006 | Woyke | 705/35 |
| 2006/0248001 A1* | 11/2006 | Graeve et al. | 705/38 |
| 2007/0156563 A1* | 7/2007 | McGill | 705/36 R |
| 2007/0198380 A1* | 8/2007 | Hynek | 705/35 |
| 2007/0244780 A1* | 10/2007 | Liu | 705/35 |
| 2007/0299753 A1* | 12/2007 | Averbuch et al. | 705/35 |
| 2008/0046353 A1* | 2/2008 | Poltorak et al. | 705/37 |
| 2008/0162336 A1* | 7/2008 | Jaffee | 705/38 |
| 2009/0037328 A1 | 2/2009 | Abuaf | 705/40 |
| 2009/0083197 A1* | 3/2009 | Gofman et al. | 705/36 T |
| 2009/0089198 A1* | 4/2009 | Kroutik | 705/37 |
| 2009/0089217 A1* | 4/2009 | Kroutik | 705/80 |
| 2009/0177575 A1* | 7/2009 | Hays | 705/37 |
| 2009/0204442 A1 | 8/2009 | Logsdon et al. | 704/4 |
| 2009/0234763 A1* | 9/2009 | Stenson et al. | 705/35 |
| 2009/0254474 A1* | 10/2009 | Gladstone | 705/37 |
| 2009/0313051 A1* | 12/2009 | Van Slyke et al. | 705/4 |
| 2010/0005019 A1* | 1/2010 | Yang et al. | 705/35 |
| 2010/0057538 A1* | 3/2010 | Hardman et al. | 705/10 |
| 2010/0145877 A1 | 6/2010 | Haug | 705/36 |
| 2010/0223174 A1* | 9/2010 | Thomas | 705/35 |
| 2010/0299238 A1* | 11/2010 | Hecht | 705/37 |
| 2011/0040664 A1* | 2/2011 | Schoen | 705/35 |
| 2011/0218826 A1* | 9/2011 | Birtel et al. | 705/4 |
| 2012/0078770 A1 | 3/2012 | Hecht | 705/37 |
| 2012/0226631 A1 | 9/2012 | Ameriks et al. | 705/36 |
| 2012/0239593 A1* | 9/2012 | von der Borch | 705/36 R |
| 2013/0262284 A1* | 10/2013 | Hardman et al. | 705/37 |

OTHER PUBLICATIONS

Anne Tergesen, "Equity release' is the newest way to turn your home into a piggy bank. But the risks can be sizable," Sep. 13, 2008, pp. 1-3.*

Centara Capital Management Group, "Form ADV—Part 2A: Brochure," Mar. 2011, pp. 1-20.*

Louis Odette, "Housing Options: For Sale by Owner," Dec. 18, 2009, pp. 1-31.*

* cited by examiner

| ID | SAN DIEGO VECTORS | MVD | TERM | CYCLE | START | MEAN | STD DEV | 5 YR HPA | 1 | 2 | 3 | 4 | 5 | 6 | 7 | 8 | 9 | 10 |
|---|---|---|---|---|---|---|---|---|---|---|---|---|---|---|---|---|---|---|
| 1 | HISTORICAL - LINEAR | 0.00% | 0 MOS | 120 MOS | 0.75 | 4.13% | 0.00% | 4.13% | 4.13% | 4.13% | 4.13% | 4.13% | 4.13% | 4.13% | 4.13% | 4.13% | 4.13% | 4.13% |
| 2 | HISTORICAL - CYCLE BOTTOM | 0.00% | 0 MOS | 120 MOS | 0.75 | 4.13% | 4.18% | 5.69% | -0.91% | 2.54% | 5.71% | 9.17% | 12.48% | 9.17% | 5.71% | 2.54% | -0.91% | -4.23% |
| 3 | HISTORICAL - CYCLE MID DOWN | 0.00% | 0 MOS | 120 MOS | 0.50 | 4.13% | 4.18% | -0.02% | 0.89% | -2.91% | -2.91% | 0.89% | 4.13% | 7.36% | 11.16% | 11.16% | 7.36% | 4.13% |
| 4 | HISTORICAL - CYCLE TOP | 0.00% | 0 MOS | 120 MOS | 0.25 | 4.13% | 4.18% | 2.35% | 9.17% | 5.71% | 2.54% | -0.91% | -4.23% | -0.91% | 2.54% | 5.71% | 9.17% | 12.48% |
| 5 | HISTORICAL - CYCLE MID UP | 0.00% | 0 MOS | 120 MOS | 1.00 | 4.13% | 4.18% | 8.20% | 7.36% | 11.16% | 11.16% | 7.36% | 4.13% | 0.89% | -2.91% | -2.91% | 0.89% | 4.13% |
| 6 | STRESSED - LINEAR | 0.00% | 0 MOS | 120 MOS | 0.75 | 2.06% | 0.00% | 2.06% | 2.06% | 2.06% | 2.06% | 2.06% | 2.06% | 2.06% | 2.06% | 2.06% | 2.06% | 2.06% |
| 7 | STRESSED - CYCLE BOTTOM | 0.00% | 0 MOS | 120 MOS | 0.75 | 2.06% | 4.18% | 3.63% | -2.98% | 0.48% | 3.65% | 7.10% | 10.42% | 7.10% | 3.65% | — | -2.98% | -6.30% |
| 8 | STRESSED - CYCLE MID DOWN | 0.00% | 0 MOS | 120 MOS | 0.50 | 2.06% | 4.18% | -2.08% | -1.17% | -4.97% | -4.97% | -1.17% | 2.06% | -6.30% | -4.97% | — | .30% | 2.06% |
| 9 | STRESSED - CYCLE TOP | 0.00% | 0 MOS | 120 MOS | 0.25 | 2.06% | 4.18% | 0.28% | 7.10% | 3.65% | 0.48% | -2.98% | -6.30% | -2.98% | 0.48% | 3.65% | 7.10% | 10.42% |
| 10 | STRESSED - CYCLE MID UP | 0.00% | 0 MOS | 120 MOS | 1.00 | 2.06% | 4.18% | 6.14% | 5.30% | 9.10% | 9.10% | 5.30% | 2.06% | -1.17% | -4.97% | -4.97% | 1.17% | 2.06% |
| 11 | STRESSED - SEVERE | 34.50% | 36 MOS | 120 MOS | 0.75 | 3.23% | 0.00% | -6.94% | -13.15% | -13.15% | -13.15% | 3.23% | 3.23% | 3.23% | 3.23% | 3.23% | 3.23% | 3.23% |

YEARS 11 TO 50 COLLAPSED FOR PRINTING →

FIG. 3

| YEAR | SAN DIEGO | DETROIT | SEATTLE |
|---|---|---|---|
| APRIL 2012 | 151.75 | 65.26 | 133.84 |
| MARCH 2012 | 149.68 | 67.71 | 131.23 |
| FEBRUARY 2012 | 149.07 | 69.94 | 128.99 |
| JANUARY 2012 | 148.74 | 70.28 | 130.03 |
| DECEMBER 2011 | 150.42 | 70.49 | 130.99 |
| NOVEMBER 2011 | 151.45 | 71.82 | 132.65 |
| OCTOBER 2011 | 152.86 | 72.82 | 134.22 |
| SEPTEMBER 2011 | 153.72 | 74.17 | 135.59 |
| AUGUST 2011 | 154.91 | 73.61 | 137.09 |
| JULY 2011 | 155.22 | 72.63 | 137.57 |
| JUNE 2011 | 155.06 | 69.47 | 137.46 |
| MAY 2011 | 154.78 | 65.70 | 136.56 |
| APRIL 2011 | 154.50 | 64.47 | 135.14 |
| MARCH 2011 | 153.88 | 65.18 | 132.97 |
| FEBRUARY 2011 | 155.05 | 67.58 | 132.85 |
| JANUARY 2011 COLLAPSED FOR PRINTING | 157.03 | 67.63 | 135.41 |
| DECEMBER 1987 | 59.40 | | |
| NOVEMBER 1987 | 59.02 | | |
| OCTOBER 1987 | 58.53 | | |
| SEPTEMBER 1987 | 58.14 | | |
| AUGUST 1987 | 57.69 | | |
| JULY 1987 | 57.26 | | |
| JUNE 1987 | 56.86 | | |
| MAY 1987 | 56.35 | | |
| APRIL 1987 | 55.85 | | |
| MARCH 1987 | 55.16 | | |
| FEBRUARY 1987 | 54.89 | | |
| JANUARY 1987 | 54.67 | | |

FIG. 4

| AGE | MALE | FEMALE | COUPLE |
|---|---|---|---|
| 62 | 2.57% | 1.49% | 1.69% |
| 63 | 2.51% | 1.49% | 1.67% |
| 64 | 2.64% | 1.59% | 1.76% |
| 65 | 2.79% | 1.70% | 1.87% |
| 66 | 2.94% | 1.83% | 1.98% |
| 67 | 3.09% | 1.97% | 2.11% |
| 68 | 3.25% | 2.12% | 2.24% |
| 69 | 3.43% | 2.29% | 2.40% |
| 70 | 3.62% | 2.48% | 2.58% |
| 71 | 3.83% | 2.69% | 2.78% |
| 72 | 4.06% | 2.93% | 3.01% |
| 73 | 4.32% | 3.20% | 3.26% |
| 74 | 4.63% | 3.48% | 3.53% |
| 75 | 5.00% | 3.81% | 3.83% |
| 76 | 5.41% | 4.16% | 4.15% |
| 77 | 5.84% | 4.54% | 4.49% |
| 78 | 6.33% | 4.96% | 4.87% |
| 79 | 6.84% | 5.41% | 5.26% |
| 80 | 7.41% | 5.89% | 5.70% |
| 81 | 8.05% | 6.41% | 6.16% |
| 82 | 8.78% | 6.97% | 6.64% |
| 83 | 9.54% | 7.56% | 7.16% |
| 84 | 10.37% | 8.20% | 7.73% |
| 85 | 11.26% | 8.87% | 8.34% |
| 86 | 12.19% | 9.59% | 9.00% |
| 87 | 13.20% | 10.37% | 9.71% |
| 88 | 14.29% | 11.20% | 10.46% |
| 89 | 15.46% | 12.08% | 11.27% |
| 90 | 16.66% | 13.01% | 12.13% |
| 91 | 17.84% | 14.00% | 13.05% |
| 92 | 19.09% | 15.05% | 14.02% |
| 93 | 20.41% | 16.13% | 15.03% |
| 94 | 21.77% | 17.29% | 16.11% |
| 95 | 23.21% | 18.51% | 17.22% |
| 96 | 24.65% | 19.69% | 18.31% |
| 97 | 26.07% | 20.84% | 19.33% |
| 98 | 27.47% | 21.92% | 20.30% |
| 99 | 28.87% | 22.94% | 21.19% |
| 100 | 30.29% | 23.88% | 21.99% |
| 101 | 100.00% | 24.95% | 22.91% |
| 102 | 100.00% | 26.23% | 24.02% |
| 103 | 100.00% | 27.69% | 25.41% |
| 104 | 100.00% | 29.31% | 26.96% |
| 105 | 100.00% | 100.00% | 100.00% |

FIG. 5

YEARS 12 TO 50 COLLAPSED FOR PRINTING →

PERIOD

| ID | DESCRIPTION | MULTIPLIER | 0 | 1 | 2 | 3 | 4 | 5 | 6 | 7 | 8 | 9 | 10 | 11 | 12 |
|---|---|---|---|---|---|---|---|---|---|---|---|---|---|---|---|
| 1 | 100% CPR | 100.0% | 0.00% | 0.00% | 0.00% | 3.53% | 3.83% | 4.15% | 4.49% | 4.87% | 5.26% | 5.70% | 6.16% | 6.64% | 7.16% |
| 2 | 125% CPR | 125.0% | 0.00% | 0.00% | 0.00% | 4.41% | 4.79% | 5.19% | 5.61% | 6.09% | 6.58% | 7.13% | 7.70% | 8.30% | 8.95% |
| 3 | 150% CPR | 150.0% | 0.00% | 0.00% | 0.00% | 5.30% | 5.75% | 6.23% | 6.74% | 7.31% | 7.89% | 8.55% | 9.24% | 9.96% | 10.74% |
| 4 | 200% CPR | 200.0% | 0.00% | 0.00% | 0.00% | 7.06% | 7.66% | 8.30% | 8.98% | 9.74% | 10.52% | 11.40% | 12.32% | 13.28% | 14.32% |
| 5 | 50% CPR | 50.0% | 0.00% | 0.00% | 0.00% | 1.77% | 1.92% | 2.08% | 2.25% | 2.44% | 2.63% | 2.85% | 3.08% | 3.32% | 3.58% |
| 6 | 100% CPR - NO ETP TERM | 100.0% | 0.00% | 0.00% | 0.00% | 0.00% | 0.00% | 0.00% | 0.00% | 0.00% | 0.00% | 0.00% | 0.00% | 6.64% | 7.16% |
| 7 | 125% CPR - NO ETP TERM | 125.0% | 0.00% | 0.00% | 0.00% | 0.00% | 0.00% | 0.00% | 0.00% | 0.00% | 0.00% | 0.00% | 0.00% | 8.30% | 8.95% |
| 8 | 150% CPR - NO ETP TERM | 150.0% | 0.00% | 0.00% | 0.00% | 0.00% | 0.00% | 0.00% | 0.00% | 0.00% | 0.00% | 0.00% | 0.00% | 9.96% | 10.74% |
| 9 | 200% CPR - NO ETP TERM | 200.0% | 0.00% | 0.00% | 0.00% | 0.00% | 0.00% | 0.00% | 0.00% | 0.00% | 0.00% | 0.00% | 0.00% | 13.28% | 14.32% |
| 10 | 50% CPR - NO ETP TERM | 50.0% | 0.00% | 0.00% | 0.00% | 0.00% | 0.00% | 0.00% | 0.00% | 0.00% | 0.00% | 0.00% | 0.00% | 3.32% | 3.58% |
| 11 | DETERMINISTIC | YR7 | 0.00% | 0.00% | 0.00% | 0.00% | 0.00% | 0.00% | 0.00% | 100.00% | 0.00% | 0.00% | 0.00% | 0.00% | 0.00% |

NO ETP TERM = NO TERMINATIONS WITHIN EARLY TERMINATION PROVISION TERM

SYSTEMS AND METHODS FOR RESIDENTIAL REAL ESTATE RISK TRANSFERENCE VIA ASSET-BACKED CONTRACT

CROSS-REFERENCE TO RELATED APPLICATIONS

This application claims the priority benefit of U.S. Provisional Patent Application No. 61/707,317 filed on Sep. 28, 2012 and entitled "Residential Real Estate Risk Transference System Via Asset-Backed Index Swap And/or Investment Contract," the entire disclosure of which being incorporated herein by reference.

FIELD OF THE DISCLOSURE

This disclosure relates to systems and methods for residential real estate risk transference via asset-backed index swap and/or investment contract.

BACKGROUND

Owners of residential real estate may have limited options concerning 1) the management, mitigation, and transference of price risk associated with ownership and, as a corollary to this limitation; 2) the utilization of their property to create capital under traditional financing arrangements. By the same token, investors may lack an efficient way to access this asset class and associated risk/return and thereby participate in single-family detached residential real estate. Outside of thinly traded futures contracts on residential real estate indices or the outright purchase of physical properties (single family detached homes), avenues into residential real estate as an asset class is nearly non-existent. In short, there is no developed derivatives product or market that bridges the needs of homeowners (e.g., risk transference specific to their ownership experience that is not tantamount to debt or equity sale) and the needs of investors (e.g., collateralized interests in property delivered in an efficient, transparent and scalable way).

Residential real estate has accounted for a larger pool of assets than the S&P® 500 for most of the past five decades. While stock or bond options and hedging instruments are widely available as a way to manage, mitigate or access risks of these traditional assets, there are almost no similarly available derivative instruments for actual homeowners (individual or institutional). As residential property is one of the most widely held assets and often makes up the largest portion of an individual's or family's total wealth, homeowners may be unfortunately compelled to gamble with a significant portion of their net worth: a most unwelcome condition of homeownership. For instance, while an owner of an individual stock issue might sell a call option (essentially selling appreciation rights for cash) and simultaneously use the proceeds to purchase a put option (locking in their value and eliminating the risk of negative price performance) so that they might enjoy the stock dividends without price risk, no such vehicle exists for homeowners. Homeowners are in desperate need of ways to "kick the gambling habit", and enjoy the dividends of homeownership (the ability to live in the property or alternatively collect rents) without the concordant requirement to constantly speculate on future home prices. The ability to eliminate or otherwise manage risks may have saved many homeowners from the dire position they find themselves in after the collapse of the housing bubble in 2008.

At the same time, property owners often seek ways to monetize or otherwise create liquidity from the ownership of their home, perhaps in order to pay off existing debt, assist with daily expenses, or purchase investments or insurance (e.g., life insurance, long-term care insurance, home price insurance as mentioned above, and/or other insurance). In short, they may wish to transfer value otherwise tied up in the home to some other portion of their total wealth or investment/risk portfolio. They are left with only two choices: 1) sell the house, in which case they no longer enjoy the benefit of living in the property; or 2) incur certain debt and pledge their property as security for a loan.

Selling is not an option as the homeowner is seeking a way to create liquidity/monetize but retain ownership (i.e., avoid relocation and in the case of senior homeowners continue to age in place). Banks and finance companies offer products such as mortgages, direct and indirect secured loans, reverse mortgages, or revolving lines of credit as methods of using property to extend or secure credit. These are debt products and in some cases may not be available to homeowners or may be available in a limited fashion. Older age homeowners may not have sufficient current income to qualify for a traditional mortgage, and a reverse mortgage may not be sufficient based on underwriting constraints (e.g., larger house values, existing liens, location, age limits, and/or other constraints) or unavailable to younger homeowners. Broad economic and market conditions may also create obstacles to liquidity; debt-based alternatives for homeowners were severely limited during the liquidity crisis of 2008 and subsequent years and the reverse mortgage market has all but evaporated as Bank of America, Wells Fargo and Met Life have all exited the space in the last two years.

Finally, in as much as selling the property is not a welcome solution (as retention of ownership is often the very point); debt-based alternatives can be equally distasteful even when they are available. Homeowners who spent decades paying down a mortgage may not want to go sliding back into debt and the very thought of a large, lurking balance to be paid off may not be acceptable to some. Others may have a large bequest motive whereby they wish to pass on a significant property stake unencumbered by debt to the next generation. All of the existing loan products offered by banks and finance companies involve an element of certain and permanent debt incurred by the property owner until the loan is repaid. Very few existing loan products account for, or permit the use of, future appreciation of the value of the property in connection with the extension of credit. Loan products that do involve appreciation, usually tie the appreciation to the loan itself, typically in the form of a marginally reduced interest rate. These types of loans are called shared appreciation mortgages ("SAMs") and function in many respects similar to a traditional mortgage. Funds provided under a SAM make up the principal balance, which accrues interest at the reduced rate. At the time the property is sold, in addition to the repayment of the outstanding balance owed, the appreciation realized in the property is shared in accordance with the terms of the loan. Variants of SAMs exist, whereby the entire rate of return on the principal balance is driven by the appreciation of the property, but again the litmus test for being considered a loan—the absolute right of repayment—clearly marks these as debt instruments, not an outright sale of potential and future appreciation.

U.S. residential real estate, specifically single-family detached homes, is a $19 trillion dollar market relative to the $15 trillion U.S. equity market that offers investors a unique and attractive performance profile, characterized by moderate, stable returns and low correlation to most other investable asset classes. That said, the asset class has almost zero institutional exposure due a number of issues with existing methods of both actual and synthetic investment. Actual, physical ownership comes with significant holding and management costs, a cumbersome settlement and clearing process (i.e., houses are not traded on exchanges), lack of efficient and frequent price transparency (i.e., homes need to be appraised for valuation) and generally very low liquidity relative to traditional asset classes such as stocks and bonds. Diversified, direct investment via physical ownership in residential real estate is hard to achieve.

Synthetic or indirect exposure can be achieved through futures contracts which are linked to S&P® Case-Shiller Indices® and traded on the Chicago Mercantile Exchange (CME), though these products are very thinly traded. The illiquidity created by a lack of natural buyers and sellers creates very wide spreads between "bid" and "offer" prices. Because of residential real estate's low volatility and clear, long-term cyclicality, speculators or investors (without hedging needs) tend to all have the same view at the same time. Homeowners (natural sellers) cannot use these contracts to hedge and transfer risk of changes in home prices as the limited term of the contracts (2 years) and wide spreads create insurmountable risk management costs. Perhaps most importantly, the contracts offered by the CME are futures contracts (regulated by the CFTC and the Commodity Exchange Act) with standardized asset, quantity, quality and investment terms. Put differently, they are not specific to both the property considered and the homeowner's needs (e.g., quantity or face amount and the term of the contract) and thus are not viable for efficient risk transfer. Given this absence of a large population of ready and willing homeowners as natural sellers of interests in real property via the available futures contracts, potential investors and speculators (natural buyers) have similarly not adopted this as a means of investment in residential real estate. Further, the straightforward, unstructured (i.e., there are no protections in the event home prices take time to perform in their historically stable, positive fashion) contract does not appropriately reward the investor for the illiquidity risks and market friction inherent in the CME futures. Finally, the futures contracts are not interests in real property and lack the security of being on title to a tangible, real asset. In an era of liquidity crises and bank defaults, some investors demand a "gold standard" of collateral behind their investments as opposed to the credit risks of large banks or other investors as counterparties.

The only other means of investing in residential real estate in an efficient and diversified fashion would be via a REIT structure or similar pooled investment vehicle. This is little different than the investor actually owning physical property outright, as it simply pools investors and ultimately passes on the same hurdles, costs (maintenance, property tax, property management, acquisition and disposition) and risks (vacancy and tenant risks, refinance risks for mortgage-financed transactions). Similar to direct ownership, valuation is cumbersome at best and opaque at worst as it requires actual appraisal of the real estate asset; this opacity has plagued the non-traded REIT space for years as REIT sponsors would arbitrarily set share price despite obvious changes in real estate markets. Just as in direct ownership of physical real estate, the REIT investor ultimately bears the concordant risks of maintenance, operation, tax, vacancy, etc. As such, the investor (via the REIT) must not only pay for the utility value of the property (the ability to live there), they must then also operate the property in order to recapture that value via rental streams.

The futures contracts may be an ill-fit proxy for non-customized risk transfer and wagering; shared appreciation mortgages are loan instruments that may merely capture additional value from the investor with little benefit to homeowners. Existing avenues (e.g., synthetic investment via futures contracts or actual ownership via physical purchase or REITs) may create a host of potential taxation issues for domestic and offshore investors alike. REITs and physical ownership incur property taxes (and for non-U.S. entities FIRPTA), while the futures contracts incur income or capital gains tax, all of which subtract from net investment returns.

SUMMARY

One aspect of the disclosure relates to a system configured for real estate risk transference via a contract associated with a first real estate property. Such a contract may be an asset-backed index swap or an investment contract in which an owner entity of the first real estate property grants to an investor entity an economic right to a portion of future appreciation of the first real estate property in exchange for consideration. The contract may expire responsive to a transfer of title of the first real estate property. Exemplary implementations may provide a way to slice off the growth component of the property to an investor who wants it yet leaves the utility value and existing equity squarely in the hands of the homeowner. This division of growth and utility components may allow the homeowner to sell just the growth component of the property—and do so at a lower price in exchange for the convenience and liquidity tendered.

Exemplary implementations may provide a cost effective risk transference tool that allows homeowners (natural sellers) to sell their future appreciation and tailor the term of this risk transfer to their individual homeownership experience (e.g., the contract ends precisely when the homeowner sells the property or passes away). Tailoring to the individual's actual property ownership experience may allow for a more efficient transfer (or "perfect fit" whereby the homeowner need not absorb the cost of customization or be made whole for the inability to customize) and therefore more willing participants—and ultimately better prices offered to those absorbing the risk. At the same time, this tool may appropriately reward the investor (natural buyer) for the illiquidity risk they now bear, and thus may create viable access directly to the homeowner and the very large but otherwise inaccessible pool of assets they represent.

For the investor, the tool may create an efficient means of investing in U.S. residential real estate that offers the benefits of easy mark-to-market like futures (i.e., not reliant on physical appraisal for valuation estimates); specifically it may be tied to an index or other periodic and public valuation metric and remove idiosyncratic, property specific risks and simultaneously create instant diversification. At the same time, it may offer the benefits of actual investment in real property: it may directly reach all the way to a homeowner as opposed to other speculators or investors (i.e., a motivated counterparty seeking liquidity/risk hedging as opposed to simply the other side of an investment view), the collateral and security benefits of being on title of actual real estate assets, and the avoidance of otherwise costly taxation issues created by both existing avenues of physical (property tax or FIRPTA) and synthetic ownership (income or capital gains tax).

Exemplary implementations may provide an alternative investment or swap-type structure such that property owners may mitigate their exposure to home price changes as well as sell the future appreciation of property in exchange for capital advances and do so without the requirement of selling or incurring certain debt. This type of swap or risk transference structure may not only allow for the management of risks and creation of liquidity by the homeowner, but may simultaneously allow for the transference of those risks to investors wishing to access an attractive asset class that is otherwise costly, cumbersome and all but inaccessible.

In some implementations, the system may include one or more servers. The server(s) may be configured to communicate with one or more client computing platforms according to a client/server architecture. The users may access the system via the client computing platform(s). The server(s) may be configured to execute one or more computer program modules. The computer program modules may include one or more of a current-cash-settlement-valuation module, a periodic-cash-settlement-value-projection module, a projected-home-price-index-construction module, an early-termination-value-determination module, a conditional-prepayment-rate-vector-determination module, a projected-cash-flow-contract-valuation module, a stochastic-partial-differential-equation-contract-valuation or stochastic-PDE-contract-valuation module, and/or other modules.

The modules are described, at least in part, in the context of a contract (e.g., an asset-backed index swap or an investment contract) in which an owner entity of the first real estate property grants to an investor entity an economic right to a portion of future appreciation of the first real estate property in exchange for consideration. Such a contract may expire responsive to a transfer of title of the first real estate property. The owner entity may include one or more individuals and/or one or more corporate entities (or other legal entities) that, together, own the first real estate property. The investor entity may include one or more individuals and/or one or more corporate entities (or other legal entities) that, together, seek to enter (or have entered) the contract with the owner entity.

The current-cash-settlement-valuation module may be configured to determine a current cash settlement value of the contract. The cash settlement value may be an amount due to the investor entity responsive to the contract being expired. The real estate property may be a residential real estate property, a commercial real estate property, a buildable lot, and/or other real estate property, according to various implementations. A buildable lot may be a "dirt lot" that has no residential or commercial building on it, but that can be built on in the future. The cash settlement value may be equal to the greater of a shared index appreciation and an early termination value. The shared index appreciation may be a contractual appreciation share multiplied by a change in a designated index multiplied by an initial value of the first real estate property. The appreciation share may be an amount of future appreciation conveyed by the contract. The designated index may be an index that measures prices residential housing. The initial value may be the value of the first real estate property when the contract is initially placed into force. The early termination value may be determined based on an early termination provision. The early termination provision may designate either a set schedule or an accretion model with a base amount plus an annual rate of return for a duration of an early termination period. The base amount may be a total contract cost to an investor associated with the contract. Under the set schedule, the early termination value may be determined from a table via a look-up based on an age of the contract.

The periodic-cash-settlement-value-projection module may be configured to determine future cash settlement values per period based on one or more of a term of the contract, an appreciation projection associated with the first real estate property, or a conditional prepayment rate vector. The cash settlement value for each projected period may be the greater of a shared index appreciation and an early termination value. The period of determined future cash settlement values may be daily, monthly, yearly, and/or other periodicity, according to various implementations.

The projected-home-price-index-construction module may be configured to determine a projected home price index associated with the first real estate property based on one or more home price appreciation vectors. The projected home price index may describe appreciation of the first real estate property between a projection date and a contract termination date. A given home price appreciation vector may represent a forecast scenario of an outcome of appreciation of the first real estate property. A starting point of the projected home price index may be equal to a current designated index value divided by a contact starting index multiplied by one hundred. The outcome resulting in an early termination of the contract may be an expected outcome, a stressed outcome, a situational outcome, and/or other outcome. The given home price appreciation vector may account for one or more of historical index performance, macro-economic factors, or local market demographics. The given home price appreciation vector may include one or more of a linear function, a parabolic function, a polynomial function, a sinusoidal function, or a stochastic function.

The early-termination-value-determination module may be configured to determine an early termination value of the contract. The early termination value may be an amount due to the investor entity in the event that the contract is terminated during an early termination period set forth in the contract. The early termination value may be the greater of a participation share of appreciation or an early termination amount set forth in the contract. The early termination value may be zero in the event that the contract is terminated after the early termination period set forth in the contract.

The conditional-prepayment-rate-vector-determination module may be configured to determine conditional prepayment rate vectors associated with the contract. A given conditional prepayment rate vector may represent a prepayment scenario based on a statistical likelihood the contract will terminate within a given period. The given conditional prepayment rate vector may be determined based on one or more of demographic information associated with the owner entity, home price index performance, a proximity to contract origination, an early termination provision, or model stressing. The given conditional prepayment rate vector may be dynamic and change over time.

The projected-cash-flow-contract-valuation module may be configured to determine a value of the contract based on cash flow associated with the contract by summing discounted projected cash flows for future periods. A given projected cash flow for a given period being the greater of the shared home price appreciation and the early termination value, multiplied by the conditional prepayment rate, where the shared home price appreciation equals period home price index divided by the starting home price index multiplied by the initial home value. The given projected cash flow for the given period may be discounted by a target return to arrive at a present value.

The stochastic-PDE-contract-valuation module may be configured to determine a probability of expiry per period. A given probability of expiry for a corresponding period may be based on a probability of a transfer of title of the first real estate property during the corresponding period. Transfer of title may be effected by either a sale by the owner entity of the first real estate property or death of the owner entity. The stochastic-PDE-contract-valuation module may be configured to determine a present value of the contract using a probabilistic model based on the future cash settlement values for periodic expiries, and the probabilities of expiry for corresponding periods. The stochastic PDE model may be a modified Black-Scholes model. The modified Black-Scholes model may be a Black-Scholes model that is modified by (1) synthetically replicating the contract with commonplace contracts puts and calls, (2) solving for a value of the commonplace contracts puts and calls across all possible monthly expiries, and (3) multiplying the value of the commonplace contracts puts and calls by the conditional prepayment rate or a probability of expiry in individual periods These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 3 provides exemplary home price appreciation vectors, in accordance with one or more implementations.

FIG. 4 provides an exemplary Standard and Poor's Case-Shiller Index, in accordance with one or more implementations.

FIG. 5 provides exemplary baseline prepayment rates, in accordance with one or more implementations.

FIG. 6 provides exemplary conditional prepayment rate vectors, in accordance with one or more implementations.

FIG. 7A provides an exemplary expected scenario for origination with home price appreciation being linear and based on historical home price appreciation rate, in accordance with one or more implementations.

FIG. 7B provides an exemplary expected scenario for origination with home price appreciation being cyclical, starting from a down market and based on historical home price appreciation rate, in accordance with one or more implementations.

FIG. 7C provides an exemplary stressed scenario for origination with home price appreciation being linear and based on a stressed (reduced) home price appreciation rate, in accordance with one or more implementations.

FIG. 7D provides an exemplary stressed scenario for origination with home price appreciation being cyclical, starting from a down market and based on stressed (reduced) home price appreciation rate, in accordance with one or more implementations.

FIG. 7E provides an exemplary stressed scenario for origination with home price appreciation being linear and based on historical home price appreciation rate, and conditional prepayment rate having no terminations during early termination provision term, in accordance with one or more implementations.

FIG. 7F provides an exemplary stressed scenario for origination with home price appreciation being cyclical, starting from a down market and based on historical home price appreciation rate, and conditional prepayment rate having no terminations during early termination provision term, in accordance with one or more implementations.

FIG. 7G provides an exemplary severe stressed scenario for origination with home price appreciation being AAA stressed, in accordance with one or more implementations.

FIG. 7H provides an exemplary severe stressed scenario for origination with home price appreciation being AAA stressed, and conditional prepayment rate having no terminations during the early termination provision term, in accordance with one or more implementations.

FIG. 7I conveys flex pricing for origination with a contract premium of sixteen percent, in accordance with one or more implementations.

FIG. 7J conveys flex pricing for origination with a contract premium of fourteen percent, in accordance with one or more implementations.

FIG. 7K conveys flex pricing for origination with a contract premium of sixteen percent with home price appreciation being cyclical, starting from a peaking market and based on historical home price appreciation rate, in accordance with one or more implementations.

FIG. 7L conveys flex pricing for origination with a contract premium of sixteen percent with home price appreciation being cyclical, starting from a peaking market and based on historical home price appreciation rate, and the early termination provision is extended to twelve years at twelve percent, in accordance with one or more implementations.

FIG. 7M conveys flex pricing for origination with a contract premium of sixteen percent with home price appreciation being cyclical, starting from a peaking market and based on historical home price appreciation rate, and the early termination provision is consistent at ten years at twelve percent, in accordance with one or more implementations.

FIG. 7N provides an exemplary management scenario in which a contract is aged five years, in accordance with one or more implementations.

FIG. 7O provides an exemplary management scenario in which a contract is aged five years, and there is a projected contract value risk, in accordance with one or more implementations.

FIG. 7P provides an exemplary scenario for distribution being contributed value, in accordance with one or more implementations.

FIG. 7Q provides an exemplary scenario in which application is declined, in accordance with one or more implementations.

FIG. 7R provides an exemplary scenario for distribution being Monte Carlo, in accordance with one or more implementations.

FIG. 7S provides an exemplary scenario for the application of modified Black-Scholes and Greeks on an aged contract, in accordance with one or more implementations.

DETAILED DESCRIPTION

Figure 1:
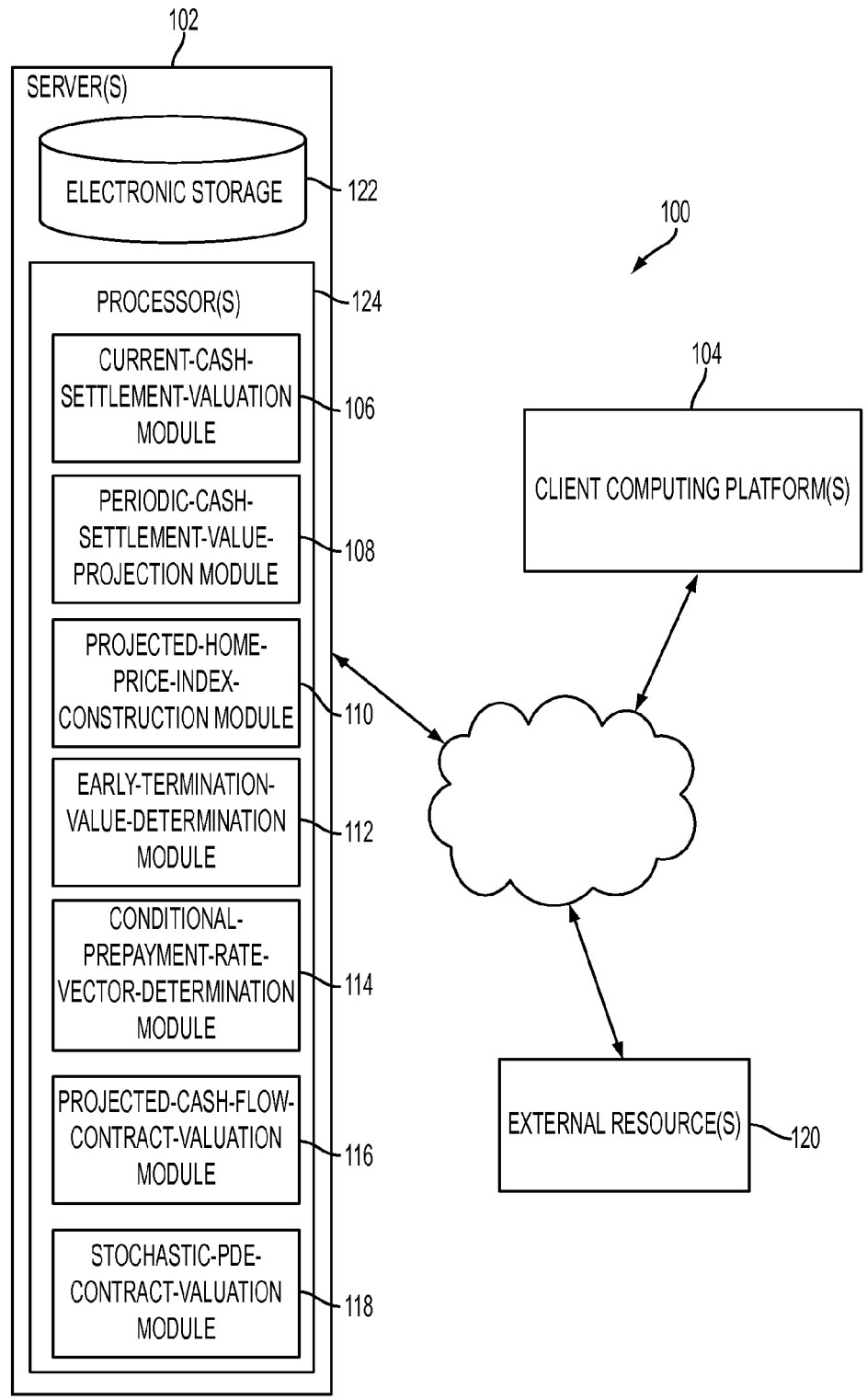
FIG. 1 illustrates a system configured for real estate risk transference via a contract by which conveys an economic right to a portion of future appreciation of real estate property, in accordance with one or more implementations.

FIG. 1 illustrates a system 100 configured for real estate risk transference via a contract by which conveys an economic right to a portion of future appreciation of real estate property, in accordance with one or more implementations. Exemplary implementations may provide, among other things, a swap and/or investment system and method whereby such that an owner or owners of property grant(s) to the swap investor the economic right to some portion of the future appreciation (any appreciation that occurs over the life of the swap or investment contract) in exchange for a fee or other consideration. The fee or other consideration may be paid in one lump sum, monthly payments, or as otherwise agreed upon between the parties.

The swap and/or investment contract (interchangeably referred to herein as "swap" or "contract") may be secured via a lien on title of the property and terminates after a fixed term or upon the transfer of title of the property (due to death of homeowner or sale). The appreciation ultimately transferred from the homeowner to the investor may be measured by as opposed to the specific appreciation of the individual property. Examples of such a measuring index may include one or more of the S&P®/Case-Shiller Index®, CoreLogic Case-Shiller Index, CoreLogic Home Price Index (HPI), OFHEO HPI, and/or other measuring indexes. Upon termination, the swap is cash settled whereby the lien may be extinguished and the homeowners (or their heirs) may pay the investor the cash equivalent of appreciation due. The swap and/or investment system and method is not a debt transaction, in accordance with some implementations. There may be no absolute right of repayment in any and all scenarios. If appreciation (as measured by the relevant index) is flat or negative for an extended period, the swap contract may expire and the investor may incur a total loss of investment. A swap fee or other investment consideration may be paid to the property owner. In exchange, the swap investor may receive the economic right to some portion of the future appreciation (any appreciation that occurs over the life of the swap). The appreciation, if any, may be calculated by subtracting the initial value of the measuring index at the point the swap is entered into from the final value of the measuring index at the time the option terminates. The swap may terminate at the earliest to occur of: (i) stated term (if not based solely on transfer of title); (ii) death of the property owner(s) resulting in transfer of title; (iii) sale or attempted sale of the property by the property owner(s); or (iv) breach of the swap and/or investment agreement by the property owner(s).

For the investor, the swap and/or investment contract may inherently rely on the long-term mean reversion of real estate to a steady, positive appreciation rate (e.g., 4% annualized). As part of the swap and/or investment contract, the risk of loss resulting from the lack of appreciation of the value of the property in the near term may be mitigated by an early termination provision. In the event the swap terminates prior to the end of the early termination provision, the homeowner may owe the investor the greater of: a) the appreciation as measured by the relevant index; or b) a return of option premium paid to the homeowner plus costs of origination plus an annual rate of return. If the swap expires after the early termination period, the investor may only have rights to the appreciation as measured by the measuring index; if this value is zero or negative in such a scenario the investor may receive nothing at contract termination.

The proceeds of the swap may additionally encompass the simultaneous transference of future negative home price performance (as measured by the relevant index) from the homeowner to the investor or a third party. The homeowner may in essence sell the upside appreciation in the property in order to fund the purchase of an instrument that transfers risk to a third party (e.g., investor or insurance company). As such, the swap and/or investment system may result in a "cashless" transaction whereby the homeowner receives the protection provided in lieu of a cash lump sum or periodic payment stream. In this instance the homeowner may be considered to have "fully hedged" their price risk. The parties assuming upside appreciation rights and downside depreciation risk, respectively, may be a single party or separate parties.

Investors may own the swap and/or investment contracts directly (appearing on title) or indirectly via a special purpose vehicle designed to effect the investment. In this case the economic interests created via the swap and/or investment contracts may be grouped into portfolios in the form of investment partnerships, companies, and/or other investment vehicles. The investors provide cash which is ultimately transferred, via the investment vehicle, to the homeowner in exchange for the rights to future appreciation (and potentially in conjunction with the investor assuming downside depreciation risk in lieu of paying the homeowner an investment fee). The investment pool performance and value (or that of an individual swap and/or investment contract) may be measured via the current as well as expected cash or contract value of the swap and/or investment contracts in total, and the derivative risks (e.g., sensitivity to changes in the index, interest rates, assumptions in future real estate index performance and mortality/mobility of homeowners), which may be calculated via processes similar to those used in computing the parameters of individual option contracts and communicated to investors. The swap and/or investment contracts (or the subsequent investment vehicles which hold portfolios of such contracts) may provide investors with synthetic, collateralized exposure to the underlying properties as measured by the indices. This exposure may distinct from a futures contract or a security and may be considered an interest in real property.

Figure 2A:
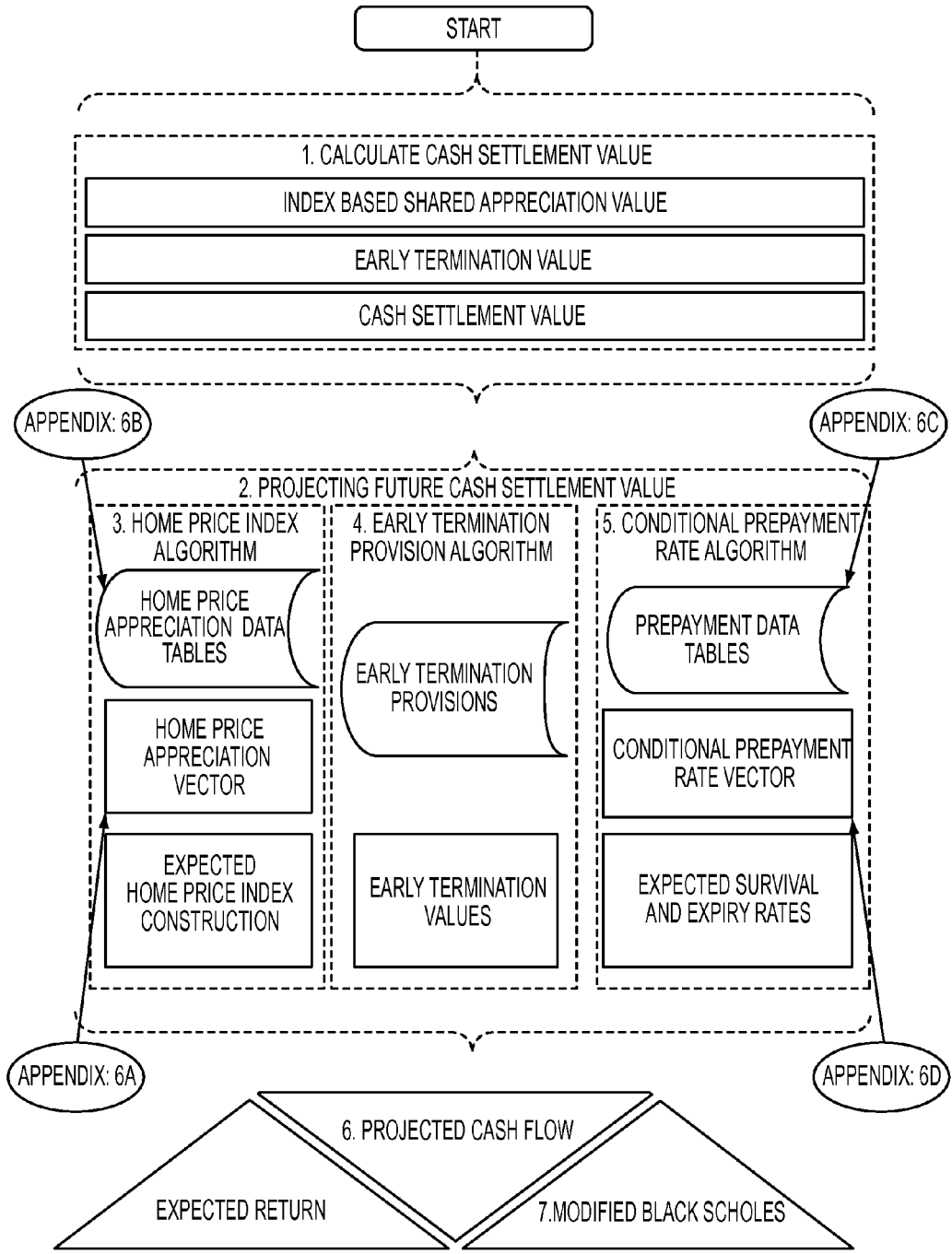
FIG. 2A illustrates an exemplary valuation procedure, in accordance with one or more implementations.

Contract valuation may be based on either the current or projected cash settlement value or the amount due at expiry. FIG. 2A illustrates an exemplary valuation procedure, in accordance with one or more implementations. The current cash settlement value may be equal to the greater of shared index appreciation or early termination value. The current cash settlement value may be calculated based on contract terms, the change in the underlying index and how much time has passed. In the cash flow method of valuation, projected cash settlement value may be determined through a series of processes and algorithms that combine contract terms, property appreciation projections and conditional prepayment rate vectors (projections of mortality or mobility of homeowners which drives contract termination). The combination of projected property appreciation and the contractual early termination provision may establish projected cash settlement values at specific points in the future. Applying a conditional prepayment rate vector across these values in time may establish a probabilistic projection of cash flow per period and, summarily, an expected value. The process may begin by projecting a future home price index with a single or series of property appreciation scenarios. Next an algorithm may establish the cash settlement value for individual projected periods as the greater of shared appreciation and early termination value. Next an algorithm may apply a single or series of conditional prepayment rate vectors to project cash flow for each period. These probabilistically adjusted future cash flows may be discounted back to a present value to arrive at a net present value. By processing the three components (i.e., contract terms, property appreciation, and conditional prepayment rates), the process may generate several metrics to value as well as measure and assess the risk and return of the contract. Through this method of valuation, exemplary implementations may provide an initial value at origination, provide periodic valuations over time, and structure valuation for distribution.

In addition to valuation over time, the valuation processing method may allow for flexible pricing at origination and ongoing risk assessment. Flexible pricing may be an iterative process where different contract terms are input and modeled. Premium (payment to homeowner) schedules and amounts may be tailored to homeowner needs whether they are lump sum or annuities. When the process finds an acceptable match of contract teens and investment expectations respectively between homeowner and buyer, the terms may be set and the application moves forward. Risk assessment may look at the change in value and/or cash flow given a change in one of the parameters and the likelihood of said change occurring.

In some implementations, system 100 may include one or more servers 102. The server(s) 102 may be configured to communicate with one or more client computing platforms 104 according to a client/server architecture. The users may access system 100 via client computing platform(s) 104. The server(s) 102 may be configured to execute one or more computer program modules. The computer program modules may include one or more of a current-cash-settlement-valuation module 106, a periodic-cash-settlement-value-projection module 108, a projected-home-price-index-construction module 110, an early-termination-value-determination module 112, a conditional-prepayment-rate-vector-determination module 114, a projected-cash-flow-contract-valuation module 116, a stochastic-partial-differential-equation-contract-valuation or stochastic-P DE-contract-valuation module 118, and/or other modules.

The modules 106, 108, 110, 112, 114, 116, and 118 are described, at least in part, in the context of a contract (e.g., an asset-backed index swap or an investment contract) in which an owner entity of the first real estate property grants to an investor entity an economic right to a portion of future appreciation of the first real estate property in exchange for consideration. Such a contract may expire responsive to a transfer of title of the first real estate property. The owner entity may include one or more individuals and/or one or more corporate entities (or other legal entities) that, together, own the first real estate property. The investor entity may include one or more individuals and/or one or more corporate entities (or other legal entities) that, together, seek to enter (or have entered) the contract with the owner entity.

The current-cash-settlement-valuation module 106 may be configured to determine a current cash settlement value of the contract. The cash settlement value may be an amount due to the investor entity responsive to the contract being expired. In some implementations, the cash settlement value may be equal to the greater of a shared index appreciation and an early termination value, which may be expressed as:

$$CSV_t = \text{Max}[SA_t, ETV_t] \qquad \text{EQN. 1}$$

where $CSV_t$ is the cash settlement value at time t, $SA_t$ is the shared index appreciation at time t, and $ETV_t$ is the early termination value at time t. In some implementations, the shared index appreciation may be a contractual appreciation share multiplied by a change in a designated index multiplied by an initial value of the first real estate property, which may be expressed as:

$$SA_t = AS \times \frac{HPI_t}{HPI_1} \times HV_1 \qquad \text{EQN. 2}$$

Where AS is the contract shared appreciation, $HPI_t$ is the home price index at time t, and $HV_1$ is the initial value. The appreciation share may be an amount of future appreciation conveyed by the contract. The designated index may be an index that measures prices residential housing. By way of non-limiting example, the designated index may be the San Diego S&P Case-Shiller Index. The initial value may be the value of the first real estate property when the contract is initially placed into force.

The early termination value may be determined based on an early termination provision in the contract. According to various implementations, the early termination provision may designate either a set schedule or an accretion model with a base amount plus an annual rate of return for a duration of an early termination period. The early termination value may be expressed as:

$$ETV_t = \text{Base Amount} \times (1+ETR)^t \qquad \text{EQN. 3}$$

where $ETV_t$ is the early termination value at time t, the base amount is a total contract cost to an investor associated with the contract, and ETR is the early termination rate. Under a set schedule, the early termination value may be determined from a table via a look-up based on an age of the contract.

The periodic-cash-settlement-value-projection module 108 may be configured to determine future cash settlement values per period based on one or more of a term of the contract, an appreciation projection associated with the first real estate property, or a conditional prepayment rate vector. The cash settlement value for each projected period may be the greater of a shared index appreciation and an early termination value. The shared index appreciation may be a contractual appreciation share. The early termination value may be an amount owed to the investor entity responsive to the contract expiring during an early termination period stipulated in the contracts. The period of determined future cash settlement values may be daily, monthly, quarterly, annually, and/or another period of time.

In some implementations, the combination of projected property appreciation and the contractual early termination provision may establish cash settlement values at specific points in the future (e.g., monthly for the next fifty years). Applying a conditional prepayment rate vector across these points may establish a probabilistic projection of cash flow. The process may begin by projecting a home price index with a single or series of property appreciation scenarios (e.g., historical, stressed, and/or other scenarios). Following the determination of cash settlement values, an algorithm may apply a single or series of conditional prepayment rate vectors to project cash flow for each period.

The projected-home-price-index-construction module 110 may be configured to determine a projected home price index associated with the first real estate property based on one or more home price appreciation vectors. FIG. 3 provides exemplary home price appreciation vectors, in accordance with one or more implementations. The projected home price index may describe appreciation of the first real estate property between a projection date and a contract termination date. A given home price appreciation vector may represent a forecast scenario of an outcome of appreciation of the first real estate property. The outcome may resulting in an early termination of the contract may be an expected outcome, a stressed outcome, a situational outcome, and/or other outcome. A home price appreciation vector or series of vectors may be national or associated with the specific designated home price index (e.g., San Diego S&P® Case-Shiller Index®). FIG. 4 provides an exemplary Standard and Poor's Case-Shiller Index, in accordance with one or more implementations. A home price appreciation vector may be constructed based on information provided by a user of system 100 and/or selected from predefined metrics. A given home price appreciation vector may include one or more of a linear function, a parabolic function, a polynomial function, a sinusoidal function, a stochastic function, and/or other functions. A given home price appreciation vector may accounts for one or more of historical index performance, macro-economic factors, local market demographics, and/or other information.

A starting point of the projected home price index may be equal to a current designated index value divided by a contact starting index multiplied by one hundred, as expressed by:

$$HPI_0 = \frac{HPI_t}{HPI_c} \times 100 \qquad \text{EQN. 4}$$

where $HPI_0$ is the current home price index, $HPI_t$ is the home price index at time t, and $HPI_c$ is the contract starting home price index. In some implementations, future index points by period may be determined based on a home price appreciation vector, as follows:

$$HPI_t = HPI_{(t-1)} \times (1 + HPA_t) \qquad \text{EQN. 5}$$

where $HPA_t$ is the home price appreciation at time t. Projected home value may be calculated by multiplying the initial home value by the period Home Price Index divided by 100, which may be expressed as:

$$HV_t = \frac{(HV_0 \times HPI_t)}{100} \qquad \text{EQN. 6}$$

where $HV_t$ is the home value at time t, $HV_0$ being the initial home value.

The early-termination-value-determination module 112 may be configured to determine an early termination value of the contract. The early termination value may be an amount due to the investor entity in the event that the contract is terminated during an early termination period set forth in the contract. The early termination period may be described in an early termination provision in the contract. The contract early termination provision may exist to incent the owner entity to not terminate the contract for a sufficient period of time, thus mitigating the effect of near-term volatility and/or negative performance in the measuring index for the investor entity. In some implementations, if the owner entity terminates the contact early through a transfer of title or other such contract designated termination, the investor entity may receive the greater of their participation share of appreciation (e.g., as measured by the measuring index) or the early termination value amount set forth in the contract, which may be expressed as:

$$ETV_t = \text{Base Amount} \times (1+R)^t \qquad \text{EQN. 7}$$

where $ETV_t$ is the early termination value at time t, Base Amount is the early termination value "Principal" (e.g., contract cost), and R is the early termination provision annual accrual rate. The early termination value may be zero in the event that the contract is terminated after the early termination period set forth in the contract.

The conditional-prepayment-rate-vector-determination module 114 may be configured to determine conditional prepayment rate vectors associated with the contract. A given conditional prepayment rate vector (or series of such vectors) may represent a prepayment scenario based on a statistical likelihood the contract will terminate within a given period. According to some implementations, a probability of the contract surviving to a given period may be expressed as:

$$P_t = P_{t-1} \times (1 - CPR_t) \qquad \text{EQN. 8}$$

where $P_t$ is the probability of contract surviving to time t and $CPR_t$ is the conditional prepayment rate at time t. A probability of the contract terminating during a given period may be expressed as:

$$q_t = P_{t-1} \times CPR_t \qquad \text{EQN. 9}$$

where $q_t$ is the probability of contract terminating in time t.

Two components of the conditional prepayment rate may be sale of the property or the death of the owner entity resulting in a transfer of title. The prepayment rates may be conditional to multiple factors, which may change the period rate. Examples of such factors may include one or more of demographic information associated with the owner entity, home price index performance, a proximity to contract origination, an early termination provision, model stressing and/or other factors. Because the contract may be terminated by transfer of title, there are several potential prepayment rate sources. Examples of sources of prepayment rates may include one or more of mortality tables, housing turnover rates, conforming residential mortgage-backed security prepayment rates, historical contract prepayment rates and/or other sources. FIG. 5 provides exemplary baseline prepayment rates, in accordance with one or more implementations. Conditional prepayment rate vectors may draw directly from prepayment tables and may apply either a no termination period or a multiplier to the table prepayment rate. FIG. 6 provides exemplary conditional prepayment rate vectors, in accordance with one or more implementations. To illustrate an exemplary implementation, by way of non-limiting example, the prepayment rate for a 75 year old female may be 3.81%. A 200% conditional prepayment rate vector may use a prepayment rate of 2×3.81% (7.62%) for a single 75 year old female not within a no-termination period. A no-termination period may vary to simply include the first couple of contract years or for as long as the early termination provision term itself. A conditional prepayment rate vector may be dynamic and may change over time. This, in turn, may change future new contract terms or in facilitating the distribution of aged contracts.

The projected-cash-flow-contract-valuation module 116 may be configured to determine a value of the contract based on cash flow associated with the contract by summing discounted projected cash flows for future periods. A given projected cash flow for a given period may be the greater of the shared home price appreciation and the early termination value, multiplied by the conditional prepayment rate, where the shared home price appreciation equals period home price index divided by the starting home price index multiplied by the initial home value. The given projected cash flow for the given period may be discounted by a target return to arrive at a present value. According to some implementations, the projected cash flow may be expressed as:

$$CF_t = \text{Max}[SA_t, ETV_t] \times CPR_t \qquad \text{EQN. 10}$$

where $CF_t$ is the projected cash flow at time t, $SA_t$ is the shared appreciation at time t, $ETV_t$ is the early termination value at time t, and CPR is the conditional prepayment rate for time period t. The shared appreciation may be expressed as:

$$SA_t = \frac{HPI_t}{HPI_1} \times HV_1 \qquad \text{EQN. 11}$$

where $HPI_t$ is the home price index at time t and $HV_t$ is the home value at time t. The early termination value may be expressed as:

$$ETV_t = \text{Base Amount} \times (1+ETR)^t \qquad \text{EQN. 12}$$

where Base Amount is the early termination value "principal" (e.g., contract cost) and ETR is the early termination rate. The net present value of the contract may be expressed as:

$$NPV = \sum \left[ \frac{CF_t}{(1+DCR)^t} \right] \qquad \text{EQN. 13}$$

where NPV is the net present value and DCR is the discount rate.

The stochastic-P DE-contract-valuation module 118 may be configured to determine probability of expiry per period. A given probability of expiry for a corresponding period may be based on a probability of a transfer of title of the first real estate property during the corresponding period. Transfer of title may be effected by either a sale by the owner entity of the first real estate property or death of the owner entity resulting in transfer of title.

According to some implementations, the contract may have at least two unique characteristics, which may create challenges when attempting to value by traditional approaches. First, the contract may not have a fixed expiry; rather it may expire when the owner entity transfers title via mortality or mobility (i.e., sale), or otherwise breaches the contract. Consequently, the contract's expected expiry may not be a fixed point in the future but a probability distribution (e.g., a combination of mobility and mortality) stretching forward in time. Second, the contract may have a return floor as defined in the early termination provision in the event that this amount is greater than the appreciation that would otherwise be due under the contract. Thus, there may be an additional value or optionality to be considered since the contract may not only provide a swap on growth, but also a secondary component based on the early termination provision. In order to incorporate the unique characteristics of the contract and unknown expiry, a probabilistic valuation approach may be used to value the contract.

The stochastic-P DE-contract-valuation module 118 may be configured to determine a present value of the contract using a probabilistic model based on the future cash settlement values for periodic expiries, and the probabilities of expiry for corresponding periods. In some implementations, the probabilistic model is a modified Black-Scholes model. The modified Black-Scholes model may be a Black-Scholes model that is modified by (1) synthetically replicating the contract with commonplace contracts puts and calls, (2) solving for a value of the commonplace contracts puts and calls across all possible monthly expiries, and (3) multiplying the value of the commonplace contracts puts and calls by the conditional prepayment rate or a probability of expiry in individual periods. The sum of these products may yield the correct, probabilistically adjusted modified Black-Scholes value of the contract.

In some implementations, the contract may be viewed as the following position: (1) long the at-the-money ("ATM") call (all expiries from one month through fifty years), (2) short the ATM put (all expiries from one month through ten years), and (3) long the [(ATM+(Premium+Origination))× (1+ETP Rate)t] put (all expiries from one month through ten years and where t=1 month through 10 years). This "moving strike" of the long put position may accounts for the ETV function, which grows over time and thus is of a different value in each monthly period. This 3-way structure may be summarily valued as a series of monthly expiries, each being multiplied by the probability of expiry (e.g., mobility or mortality) actually occurring in each discrete time period. The sum of these probabilistically adjusted values may be described as the modified Black-Scholes ("MBS") value of the option. This value may be used to determine theoretical acquisition margin (i.e., the difference between the price paid to the owner entity for the contract and its theoretical value as described by the modified Black-Scholes approach). Acquisition margin may be used as a potential origination threshold to be met for the buyer of the contract. For example, only contracts with an acquisition margin of 30% may be deemed acceptable, in accordance with some implementations.

A unique feature of the modified Black-Scholes model is its ability to deliver sensitivities to changes in underlying inputs such as volatility ("vega" or change in option value per change in volatility), risk-free rate or discount rate ("rho" or change in option value per change in interest rate), HPA measuring index ("delta" or change in option value per change in index), and/or other inputs. These derivative risks may be used to determine risks or sensitivities to changes in rate, index level, and/or other metrics. The derivative risks, in actual practice, may be used to hedge or eliminate some individual option risk and/or total portfolio risks. These derivative risk values may be viewed as acceptability thresholds for origination. For example, only contracts that yield more than a fifty basis point increase in value per 1% increase in HPA may be deemed acceptable, in accordance with some implementations.

According to some implementations, the modified Black-Scholes value and the HPA measuring index may be expressed, respectively, as:

$$MBS = \sum_{t=1}^{T} [CPR_t \times (C_{S,t} - P^1_{S,t} + P^2_{S,t})] \qquad \text{EQN. 14}$$

$$\text{Delta}(\Delta) = \sum_{t=1}^{T} [CPR_t \times (C\Delta_{S,t} - P\Delta^1_{S,t} + P\Delta^2_{S,t})] \qquad \text{EQN. 15}$$

where:
MBS=Modified Black-Scholes
$C_{S,t} = N(d_1)S - N(d_2)K^1 e^{-r(T-t)}$
$P_{S,t}^1 = N(-d_2)K^1 e^{-r(T-t)} - N(d_1)S$
$P_{S,t}^2 = N(-d_2)K^2 e^{-r(T-t)} - N(d_1)S$
$C\Delta_{S,t} = e^{-t}\Phi(d_1)$
$P^1\Delta_{S,t} = -e^{-t}\Phi(-d_1)$, where k in $d_1 = K^1$ $P^2\Delta_{S,t} = e^{-t}\Phi(-d_1)$, where k in $d_1 = K^2$ $$d_1 = \frac{\ln\left(\frac{S}{K^1}\right) + \left(r + \frac{\sigma^2}{2}\right)(T-t)}{\sigma\sqrt{(T-t)}}$$

$$d_2 = \frac{\ln\left(\frac{S}{K^1}\right) - \left(r + \frac{\sigma^2}{2}\right)(T-t)}{\sigma\sqrt{(T-t)}}$$

Figure 2B:
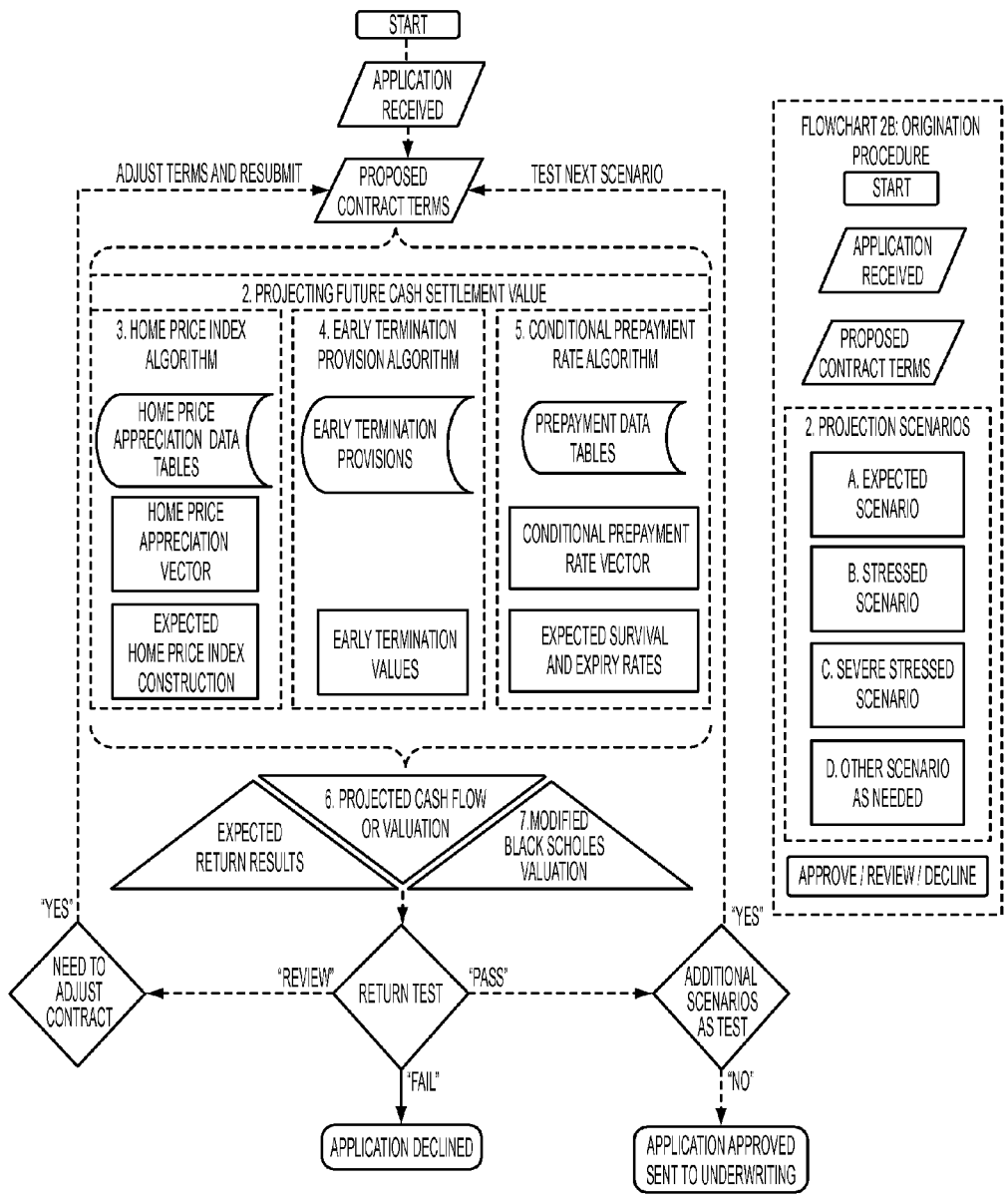
FIG. 2B illustrates an exemplary origination procedure with the valuation procedure of FIG. 2A, in accordance with one or more implementations.

(T−t)=Time to Maturity
S=Spot price of the underlying asset
$K^1$=Strike Price=Initial Home Value or Contract Home Price Index
$K^2$=Strike Price=Early Termination Value
r=risk free rate
σ=volatility
Φ=standard normal distribution function According to some implementations, when a new contract application is received, the proposed contract terms may be run through valuation procedures and subjected to multiple scenarios and return hurdles. FIG. 2B illustrates an exemplary origination procedure with the valuation procedure of FIG. 2A, in accordance with one or more implementations. The application represents a new contract with zero cash settlement value. Valuation scenarios may include one or more of an expected scenario, a stressed scenario, a situational scenario, and/or other scenarios. If the proposed contract achieves minimum return and risk metrics, it may be approved for origination and forwarded to underwriting. If the proposed contract significantly underachieves minimum return and risk metrics, it may be declined. If the proposed contract misses the minimum metrics within a designated range, then the application. may be flagged for review. The proposed contract terms may be accepted as is, or may be modified and resubmitted until the application is approved. This process may continue until the investor entity and owner entity find mutually acceptable terms or agree that no such terms exist.

In an expected scenario, proposed contract terms and homeowner demographics may be entered into a processor and/or pulled from a relational database. The expected home price appreciation and conditional prepayment rate vectors may be pulled into the processor from a relational database. An algorithm may construct the resulting expected cash flow, return, risk, and/or other metrics. The expected internal rate of return or "IRR" may be compared to the investor entity's target return. If the expected IRR is greater than the investor entity's target return the proposed contract terms are flagged as passed. If the expected IRR is significantly lower than the investor entity's target return, the proposed contract terms may be flagged as failed. If the expected IRR is below the investor entity's target return but within a designated threshold, then the proposed contract terms may be flagged for review.

In a stressed scenario, proposed contract terms and homeowner demographics may be entered into the processor and/or pulled from a relational database. The stressed home price appreciation and conditional prepayment rate vectors may be pulled into the processor from a relational database. An algorithm may construct the resulting expected "stressed" cash flow, return, risk, and/or other metrics. The expected IRR may be compared to the investor entity's target stressed return. If the expected IRR is greater than the investor entity's target stressed return, the proposed contract terms may be flagged as passed. If the expected IRR is significantly lower than the investor entity's target return, the contract terms may be flagged as failed. If the expected IRR is below the investor entity's target stressed return but within a designated threshold, then the proposed contract terms may be flagged for review.

In a severe stress scenario, proposed contract terms and homeowner demographics may be entered into the processor and/or pulled from a relational database. The stressed home price appreciation and conditional prepayment rate vectors may be pulled into the processor from a relational database. An algorithm may construct the resulting expected "stressed" cash flow, return, risk, and/or other metrics. The expected IRR may be compared to the buyer's target stressed return. If the expected IRR is greater than the investor entity's target stressed return, the proposed contract terms may be flagged as passed. If the expected IRR is significantly lower than the investor entity's target return, the proposed contract terms may be flagged as failed. If the expected IRR is below the investor entity's target stressed return but within a designated threshold, then the proposed contract terms may be flagged for review.

Additional scenarios may be run as necessary for reasons including but not limited to additional buyer requirements or risk return thresholds, macro-economic conditions and special circumstances such as non-traditional contract terms return hurdles or risk parameters.

Figure 7A:
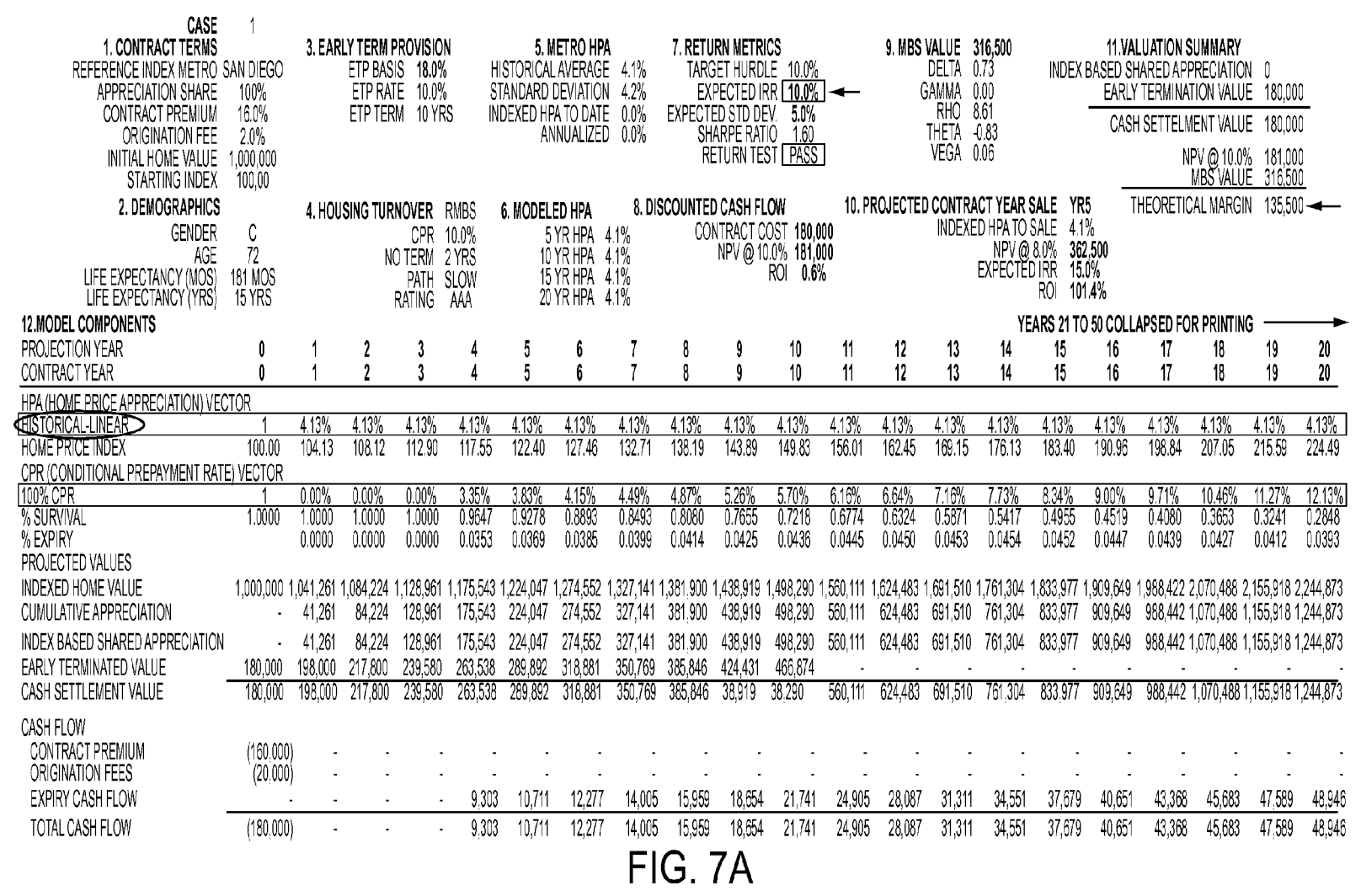
Figure 7B:
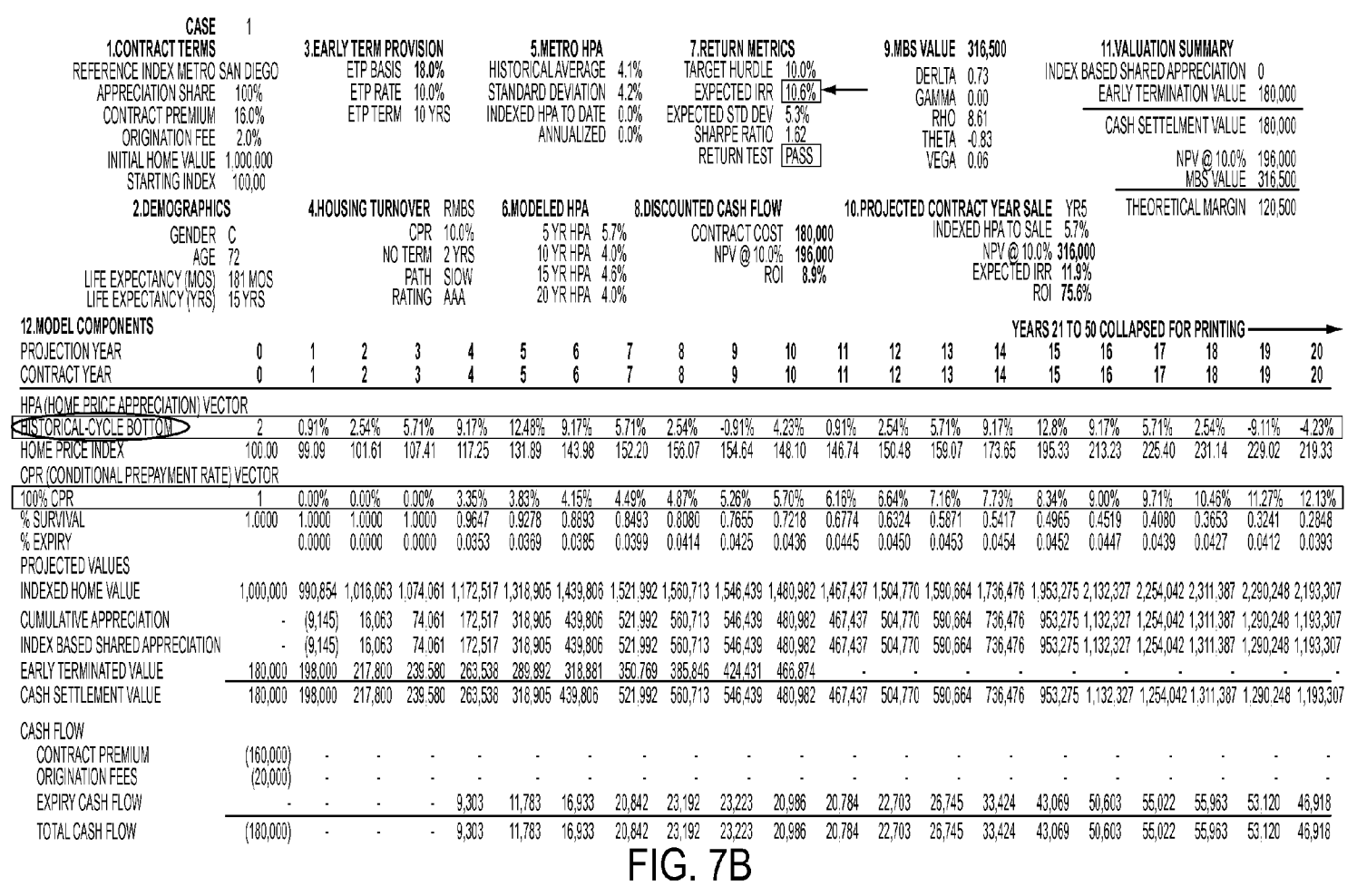
Figure 7C:
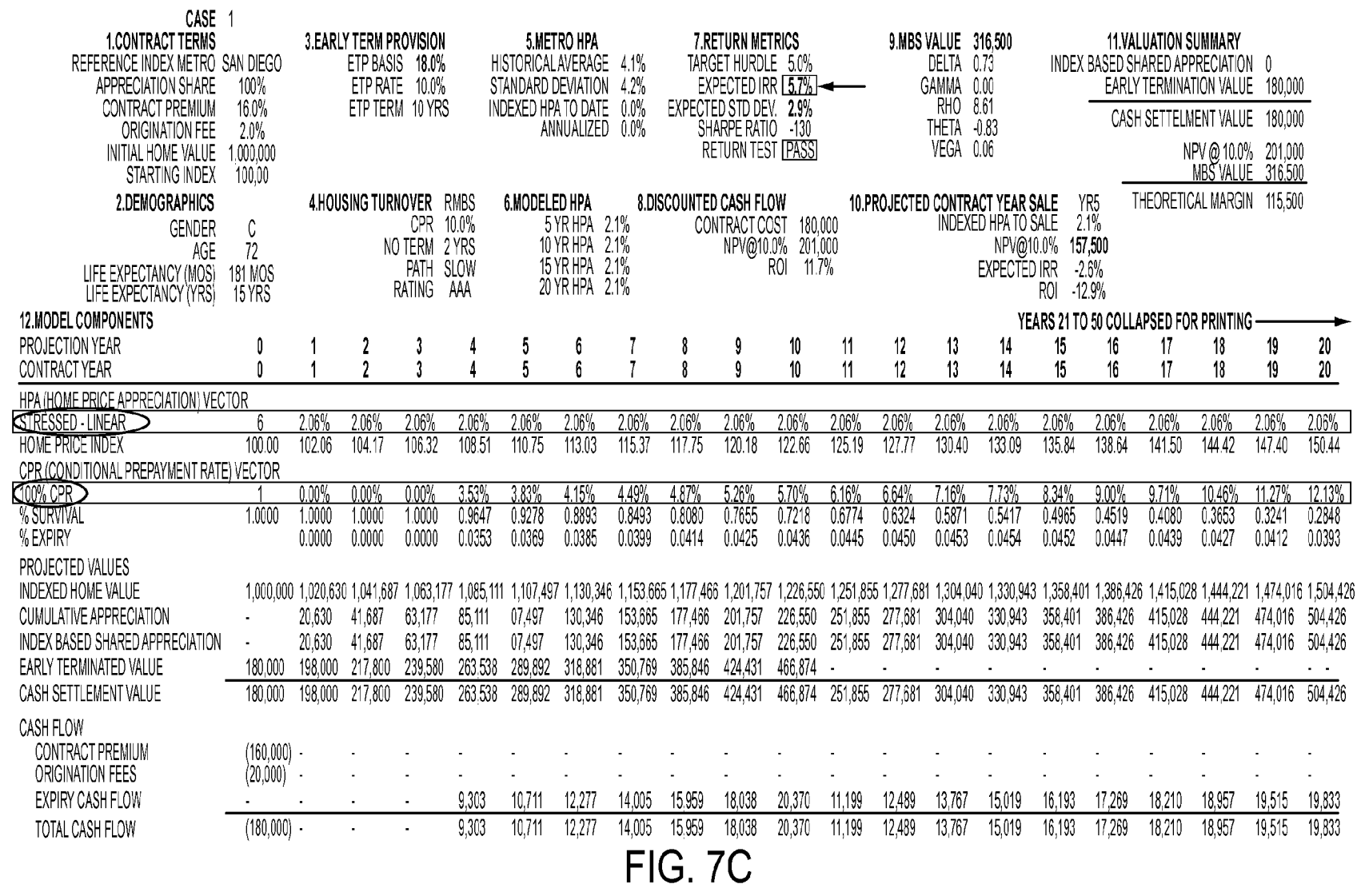
Figure 7D:
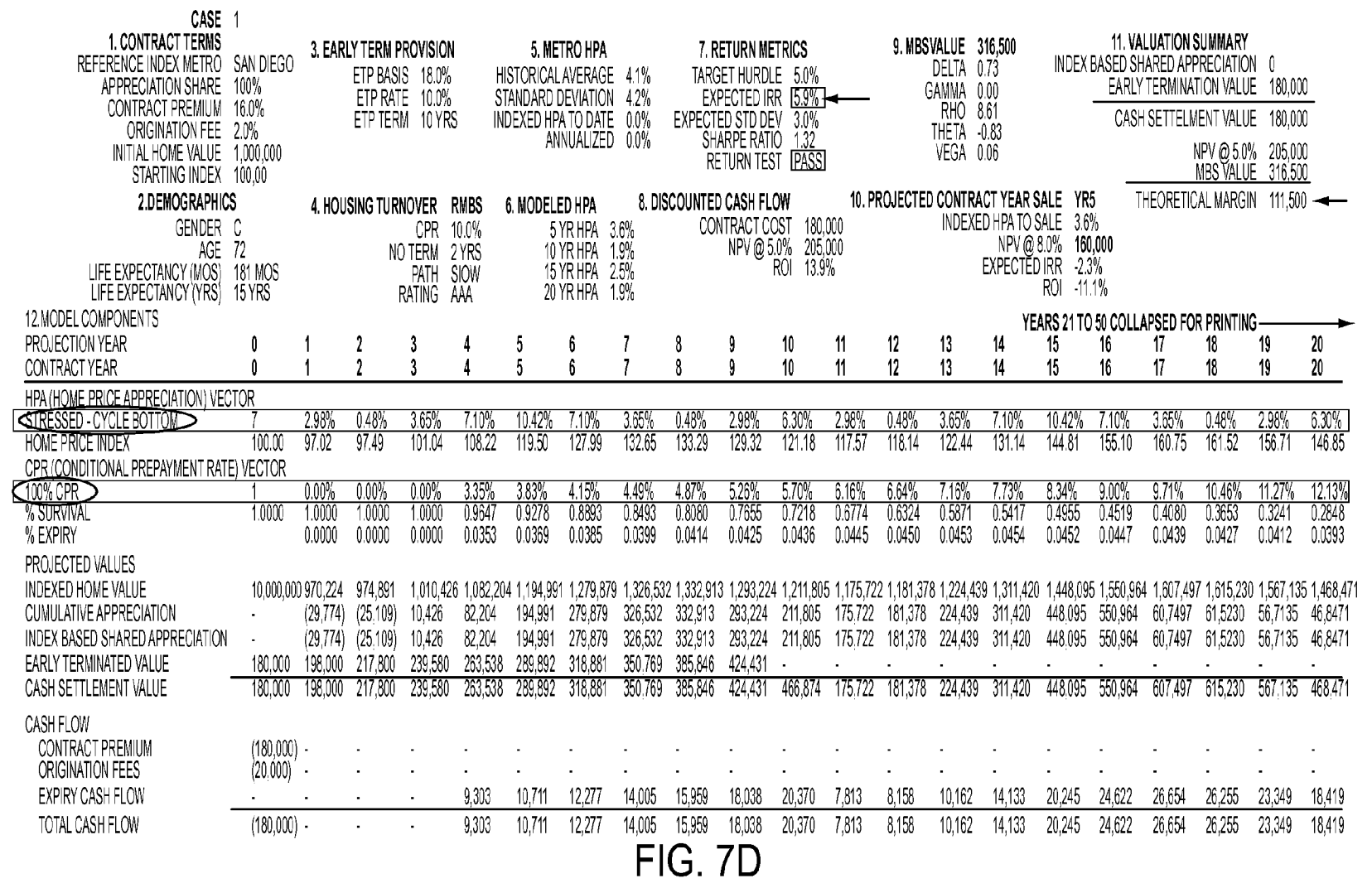
Figure 7E:
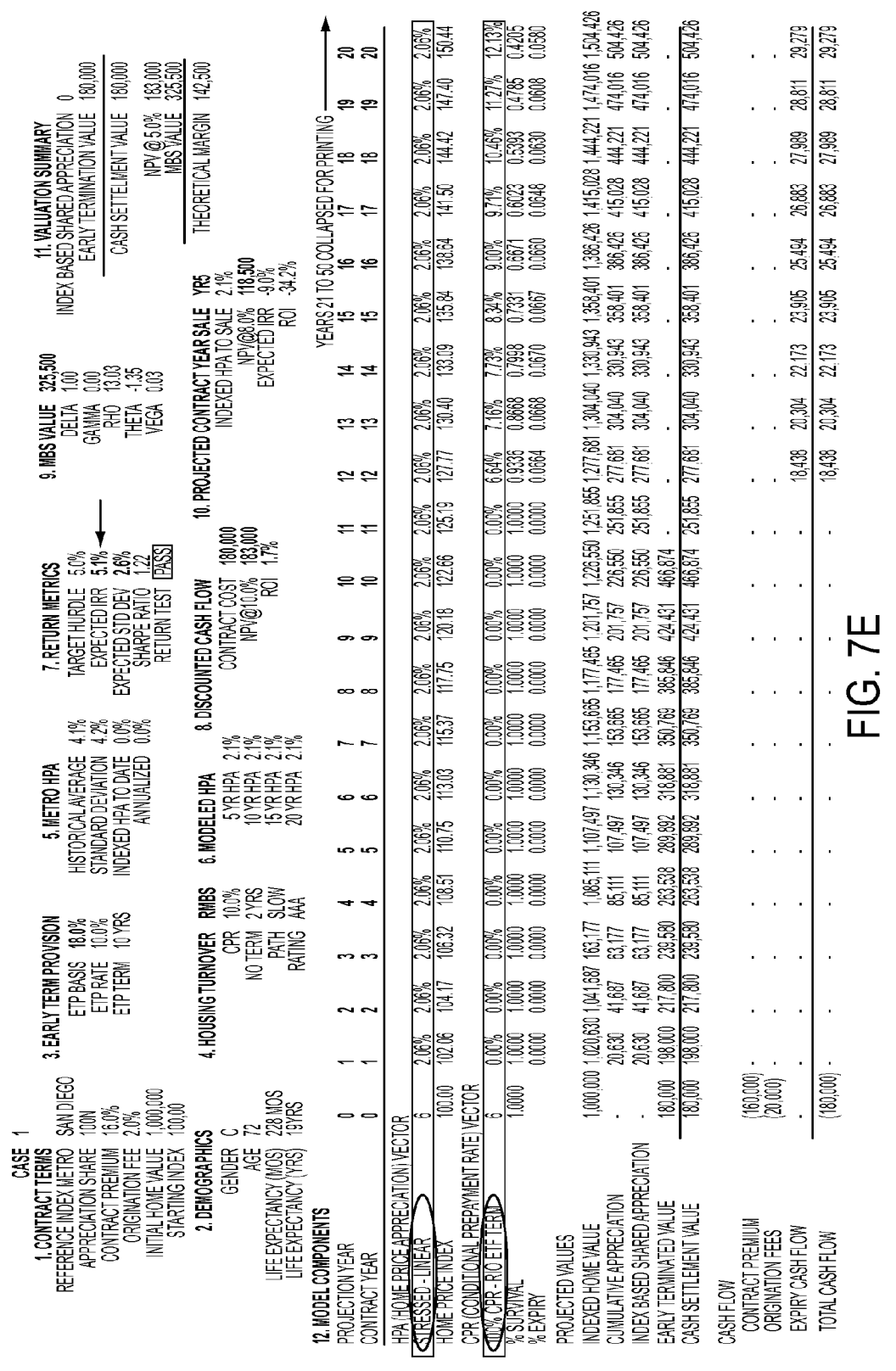
Figure 7F:
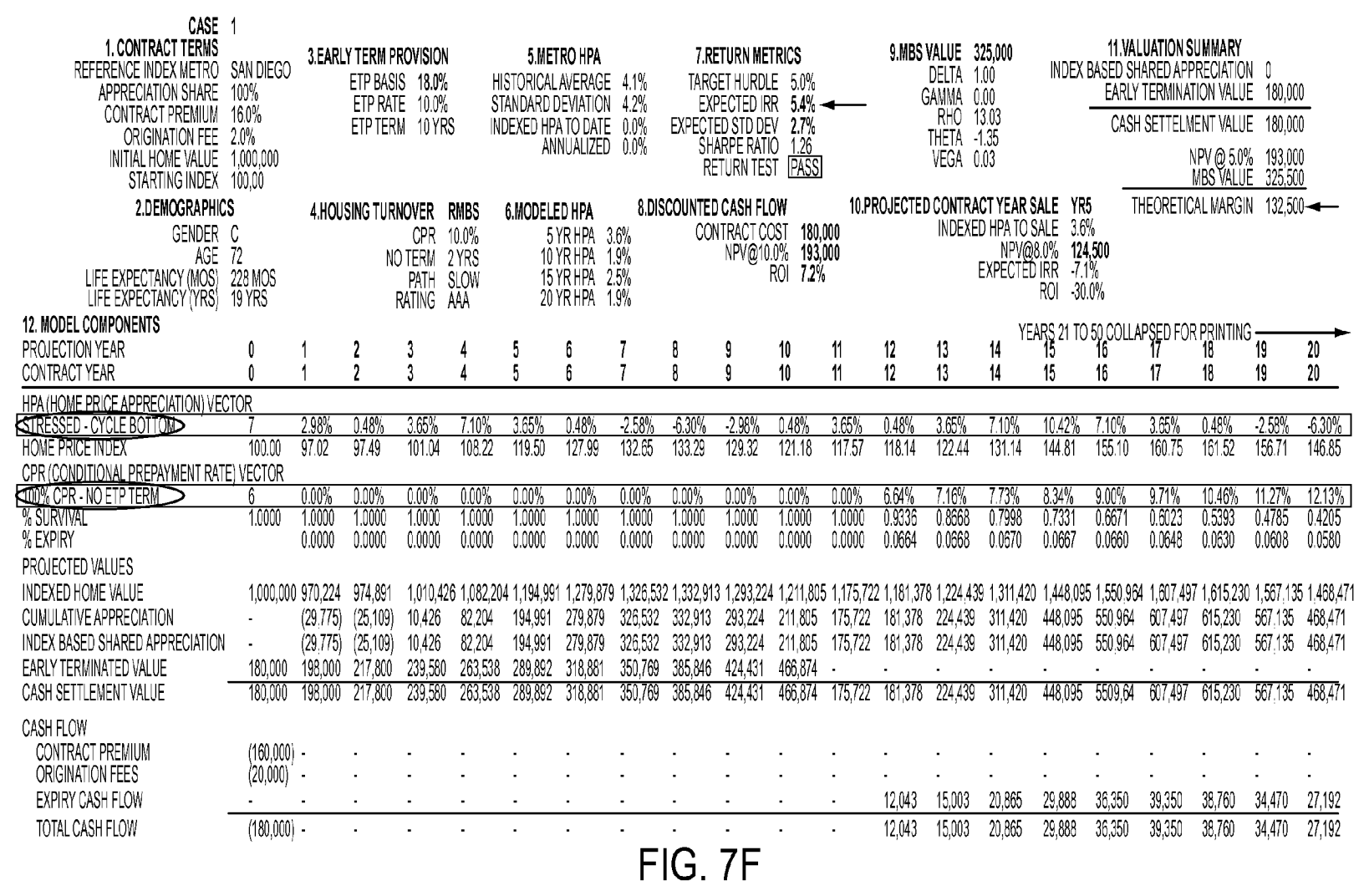
Figure 7G:
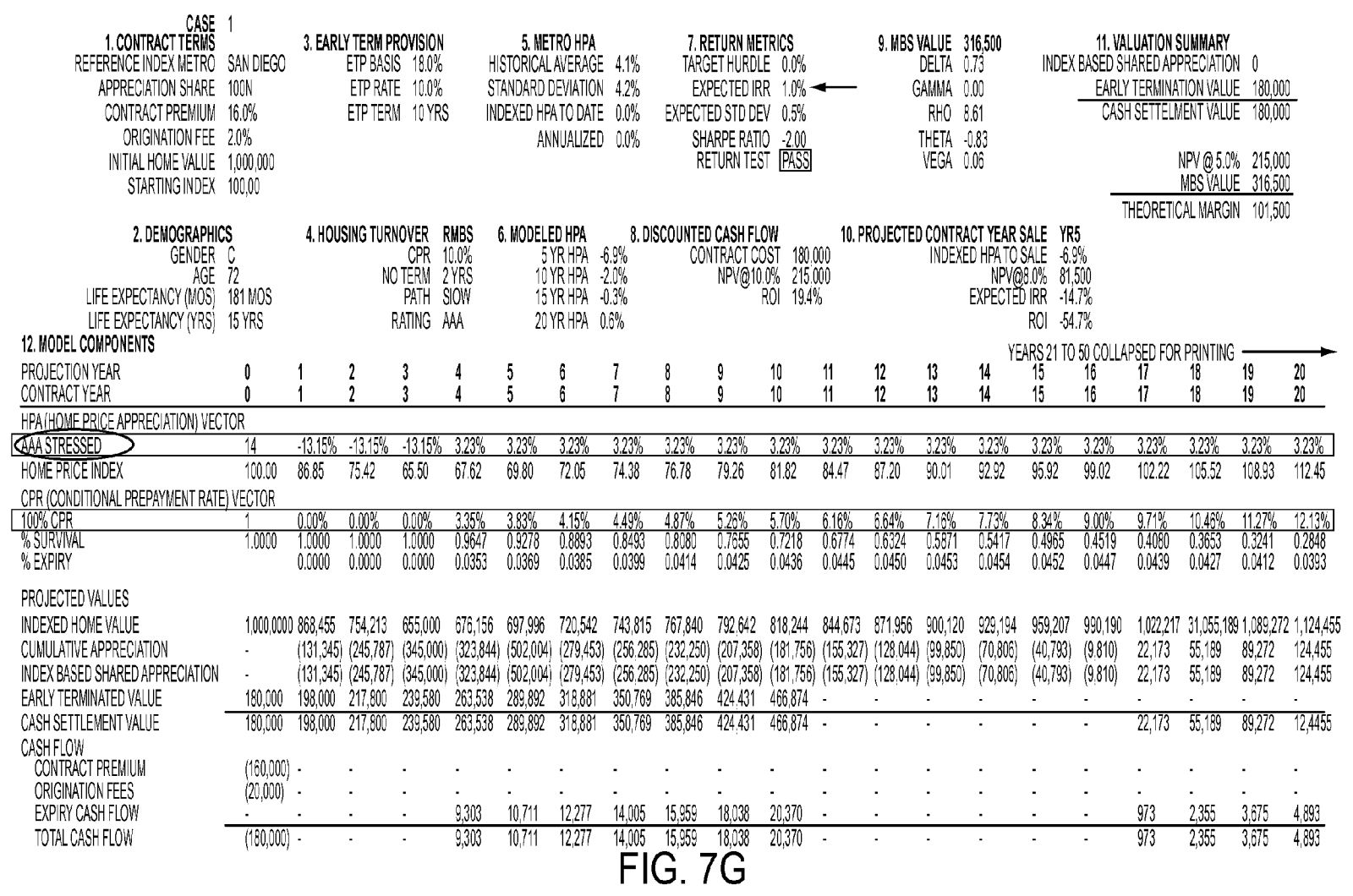
Figure 7H:
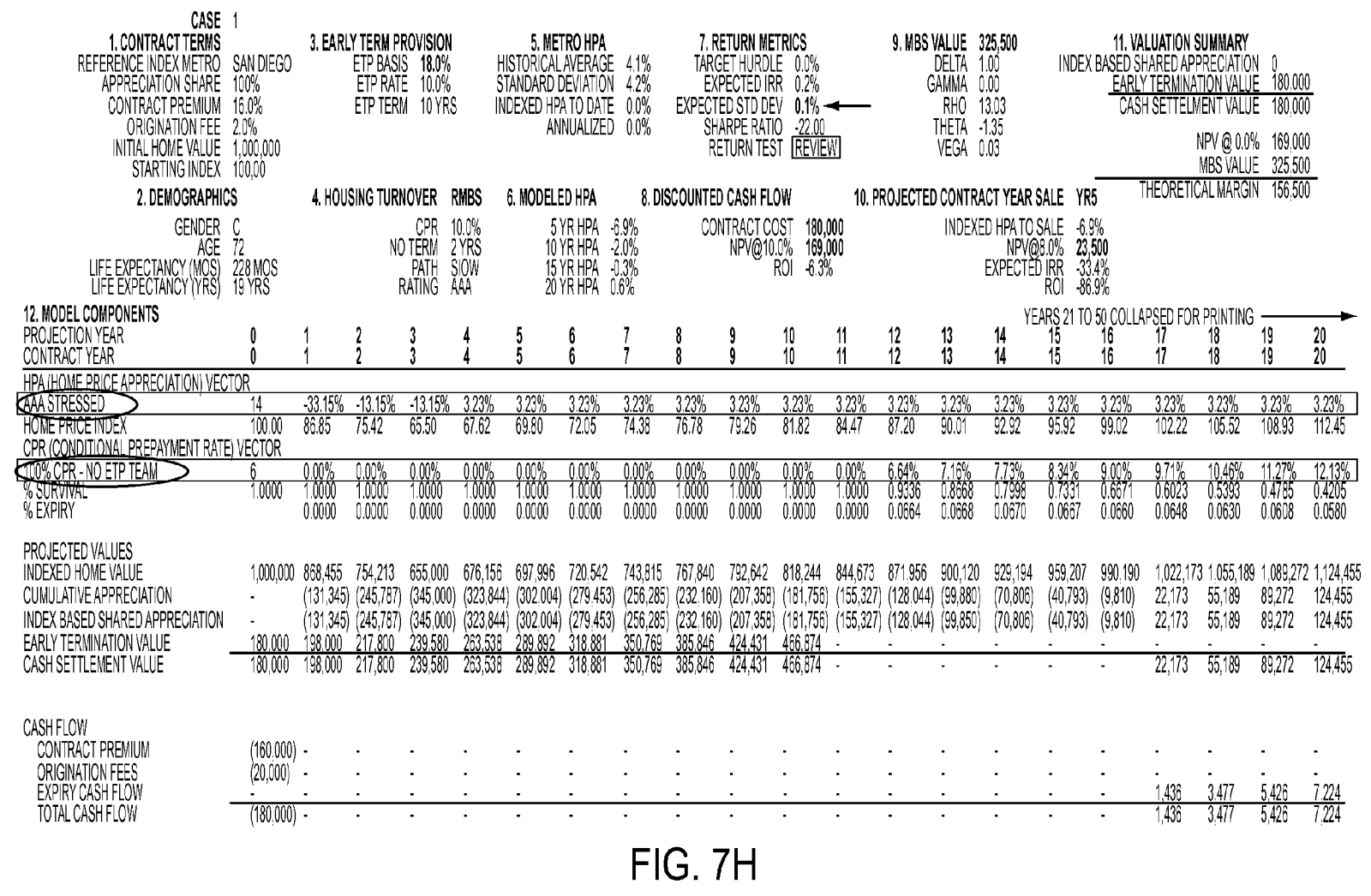
Figure 7J:
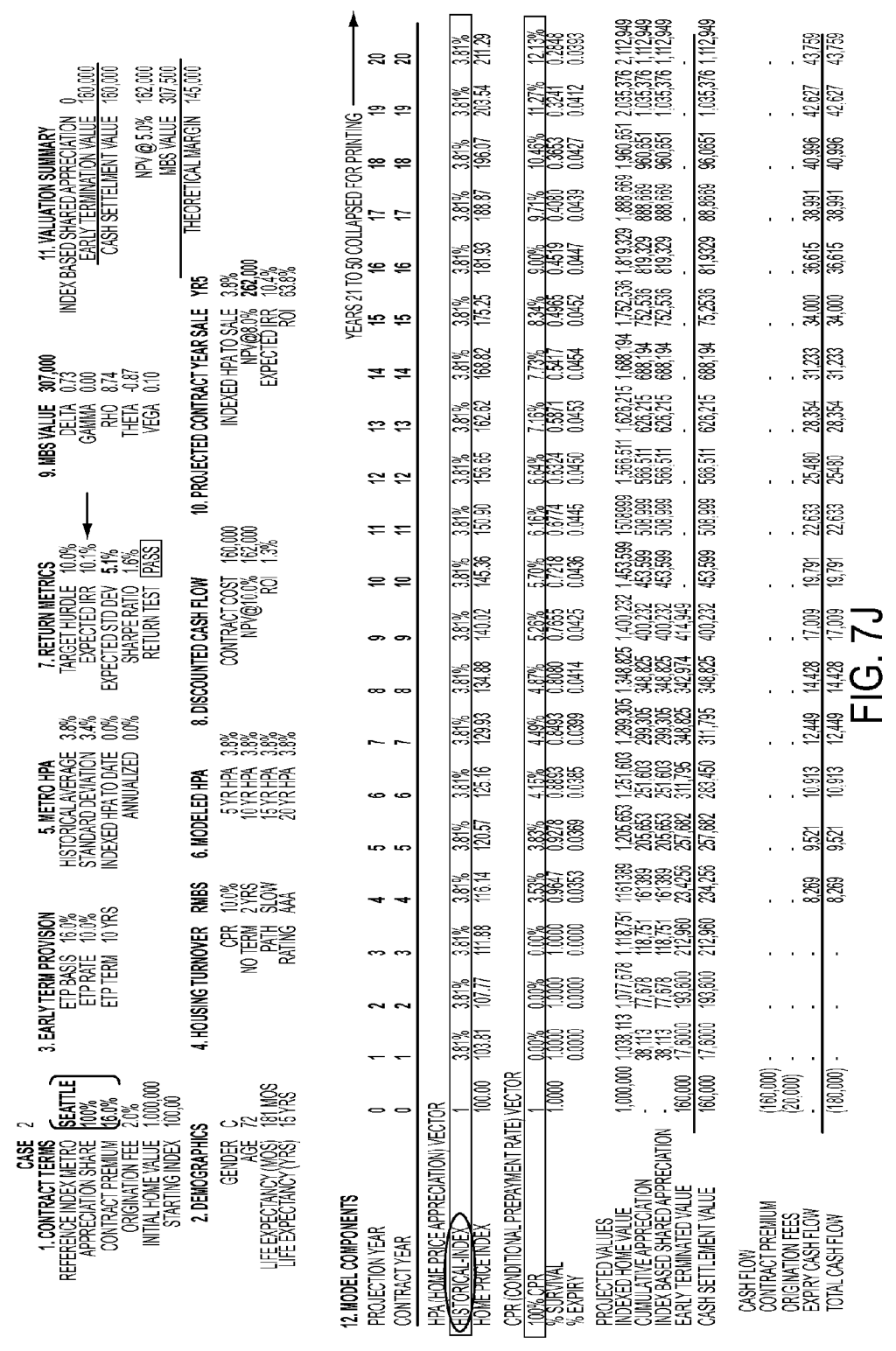
Figure 7K:
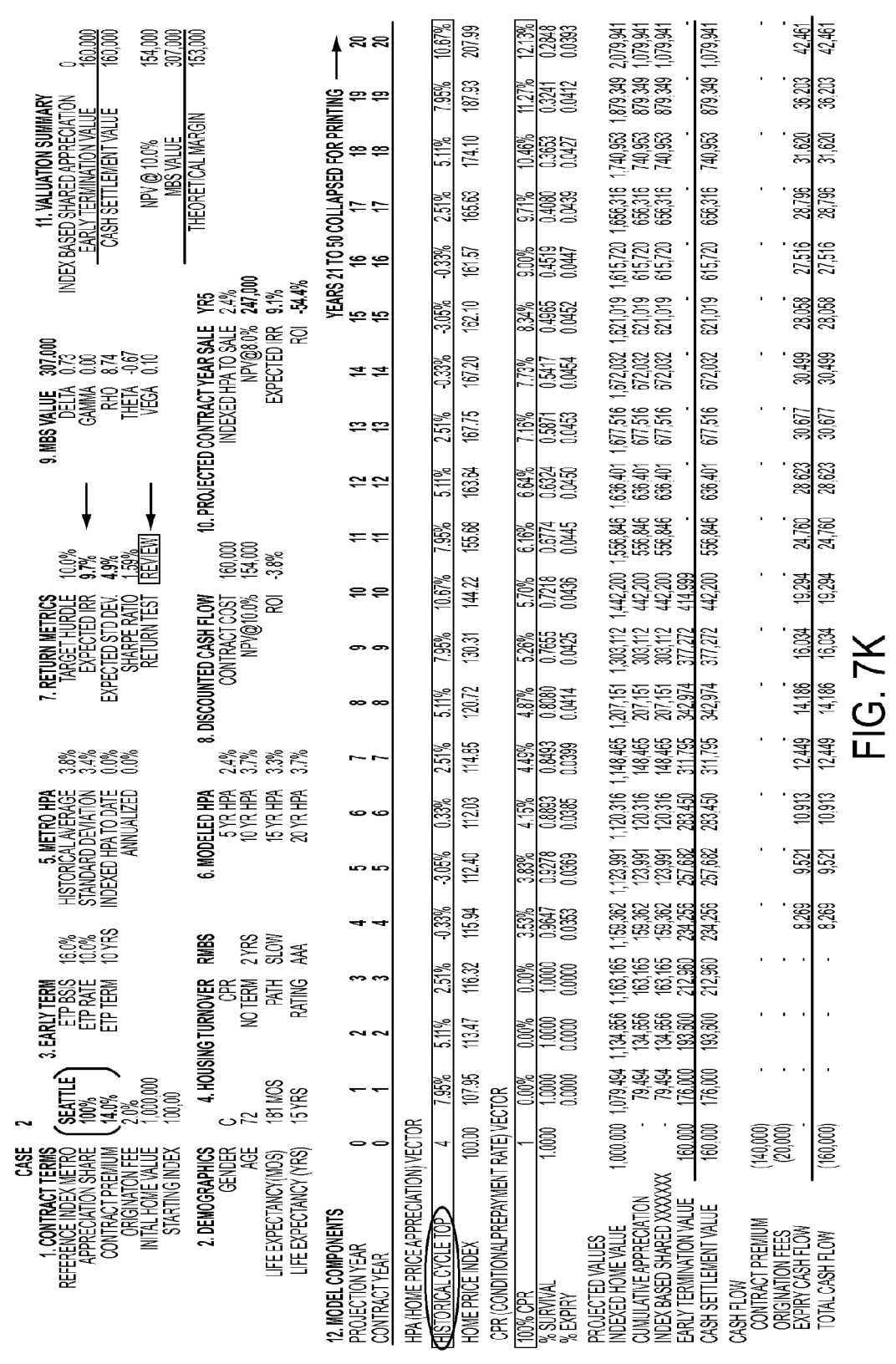
Figure 7L:
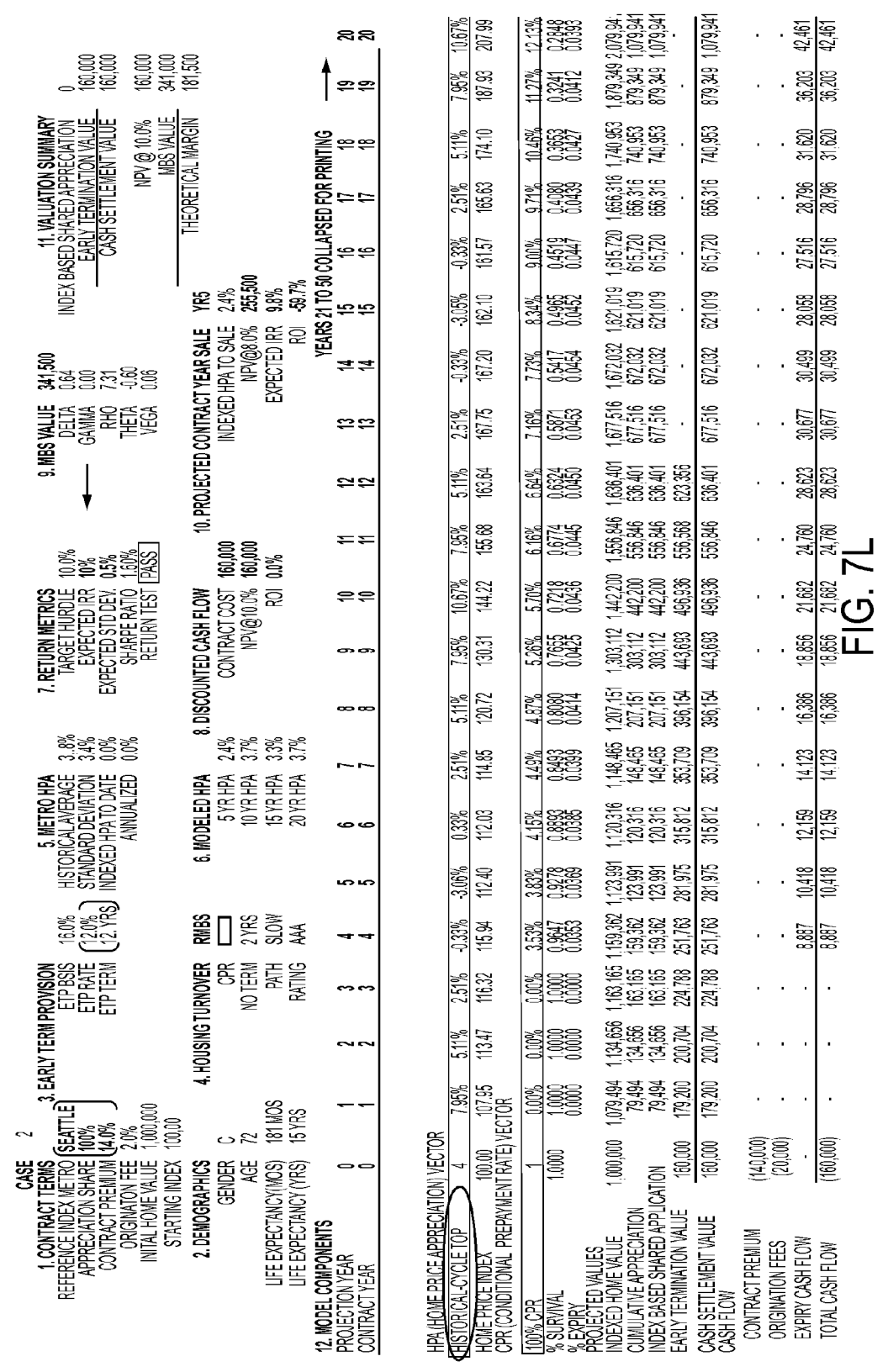
Figure 7M:
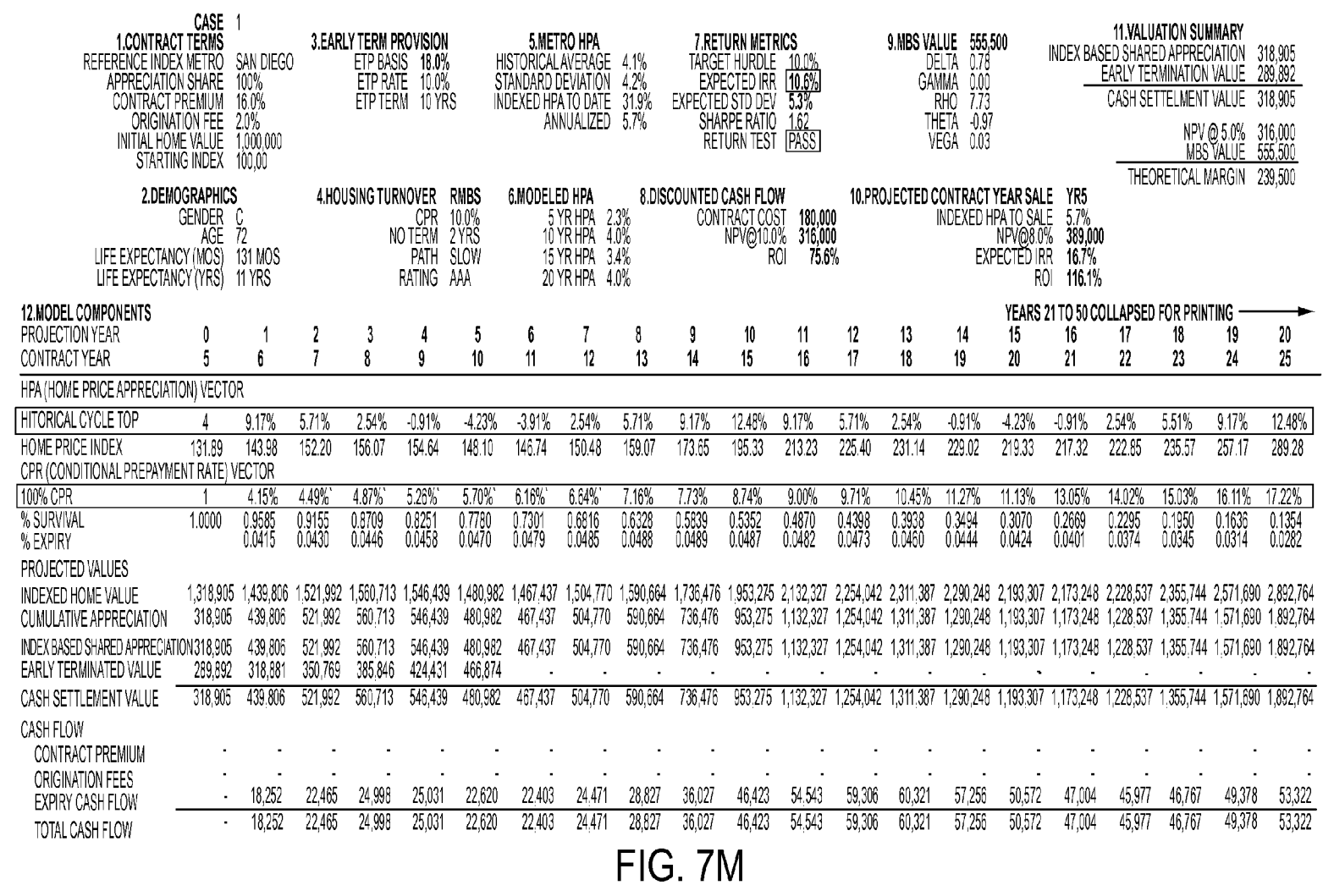
Figure 7N:
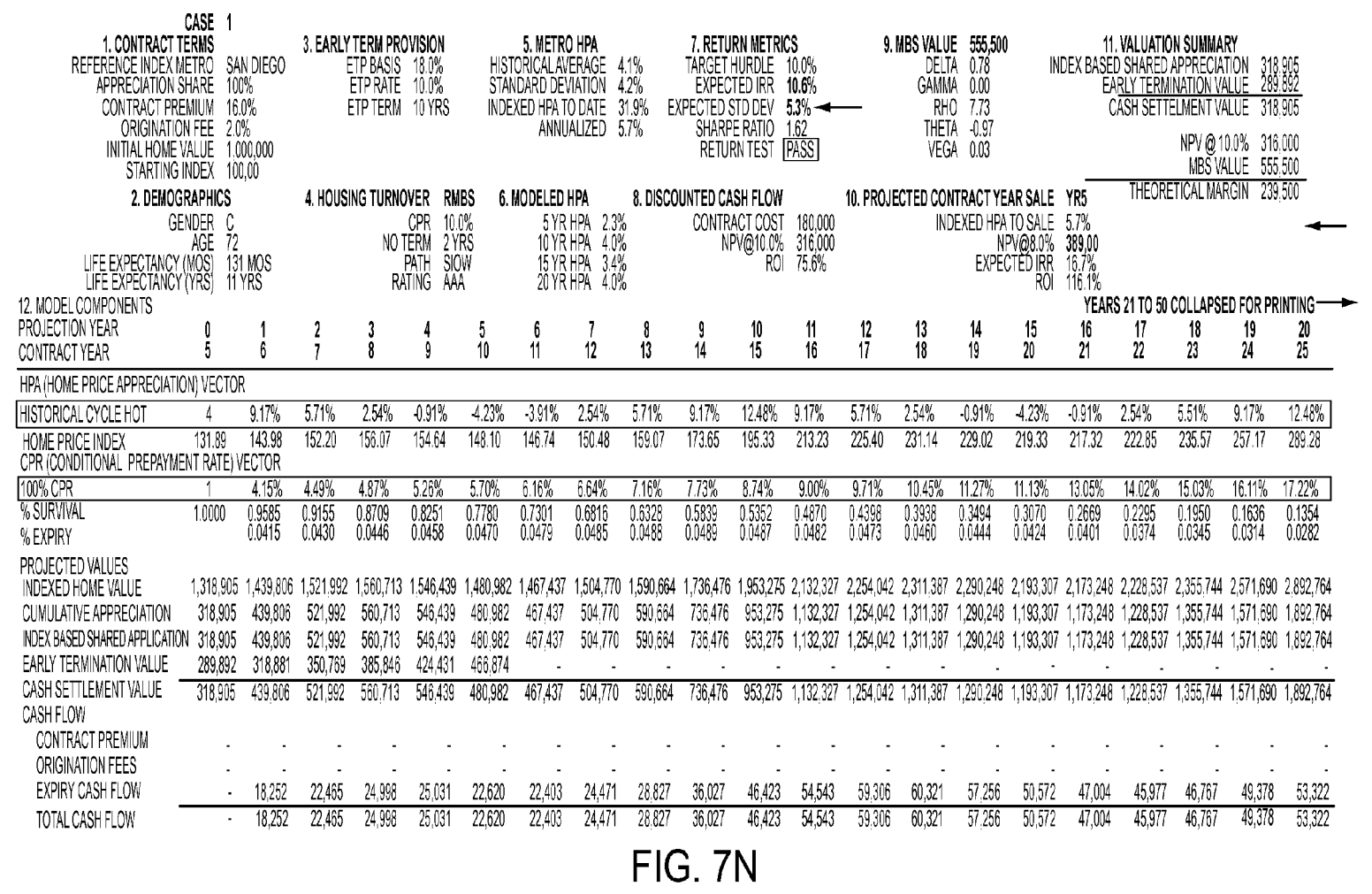
Figure 7P:
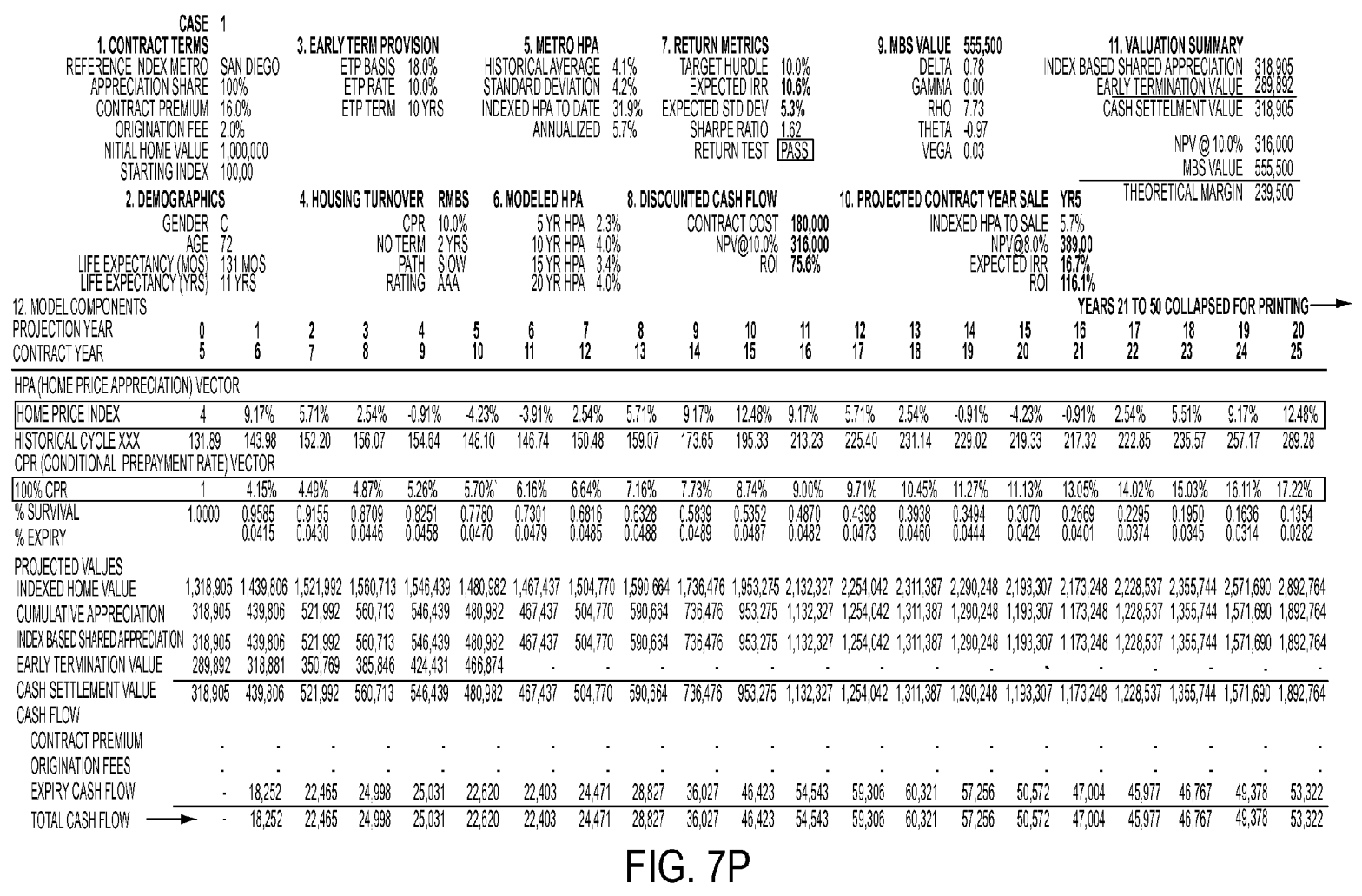
Figure 7Q:
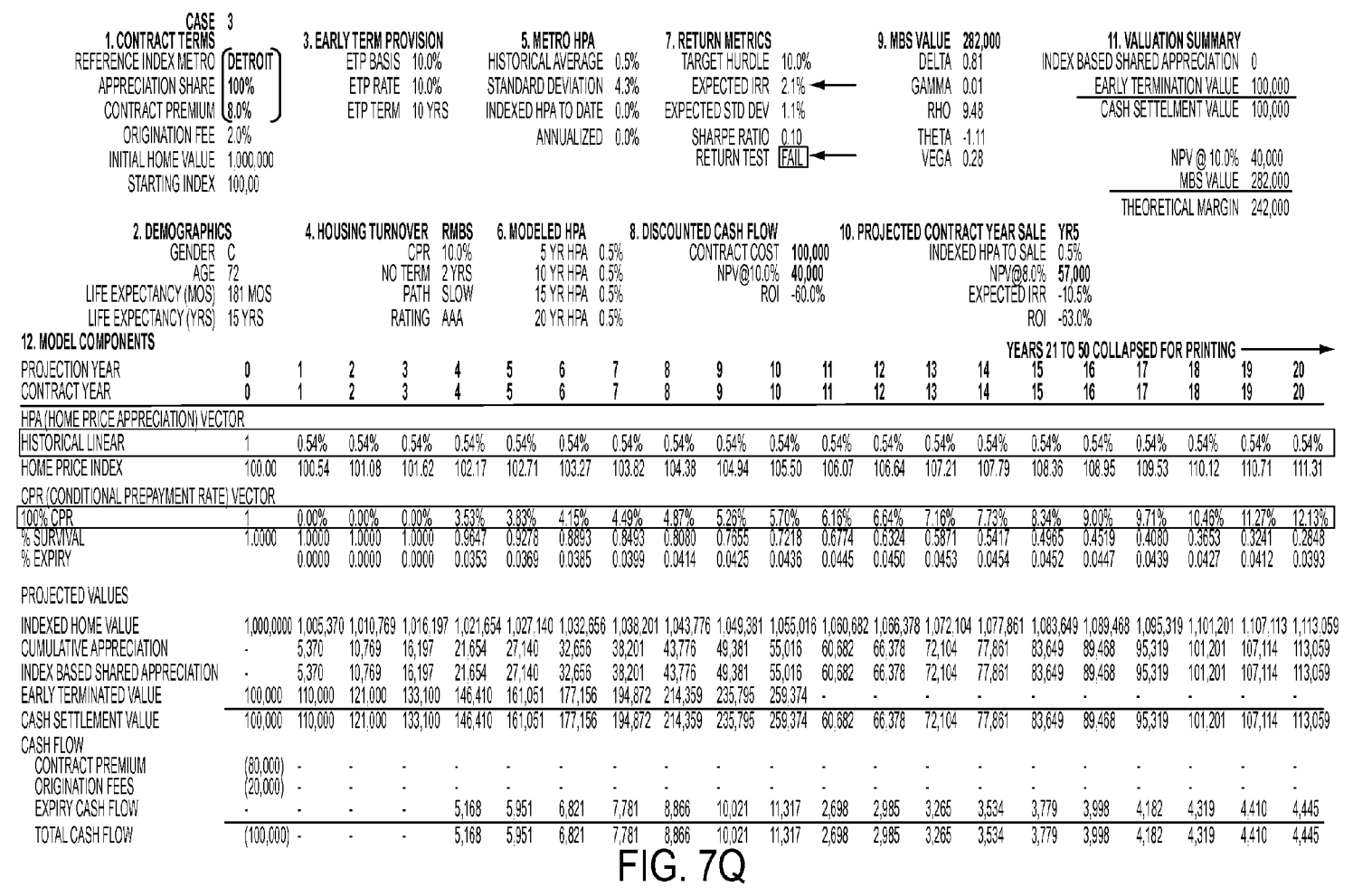
Figure 7R:
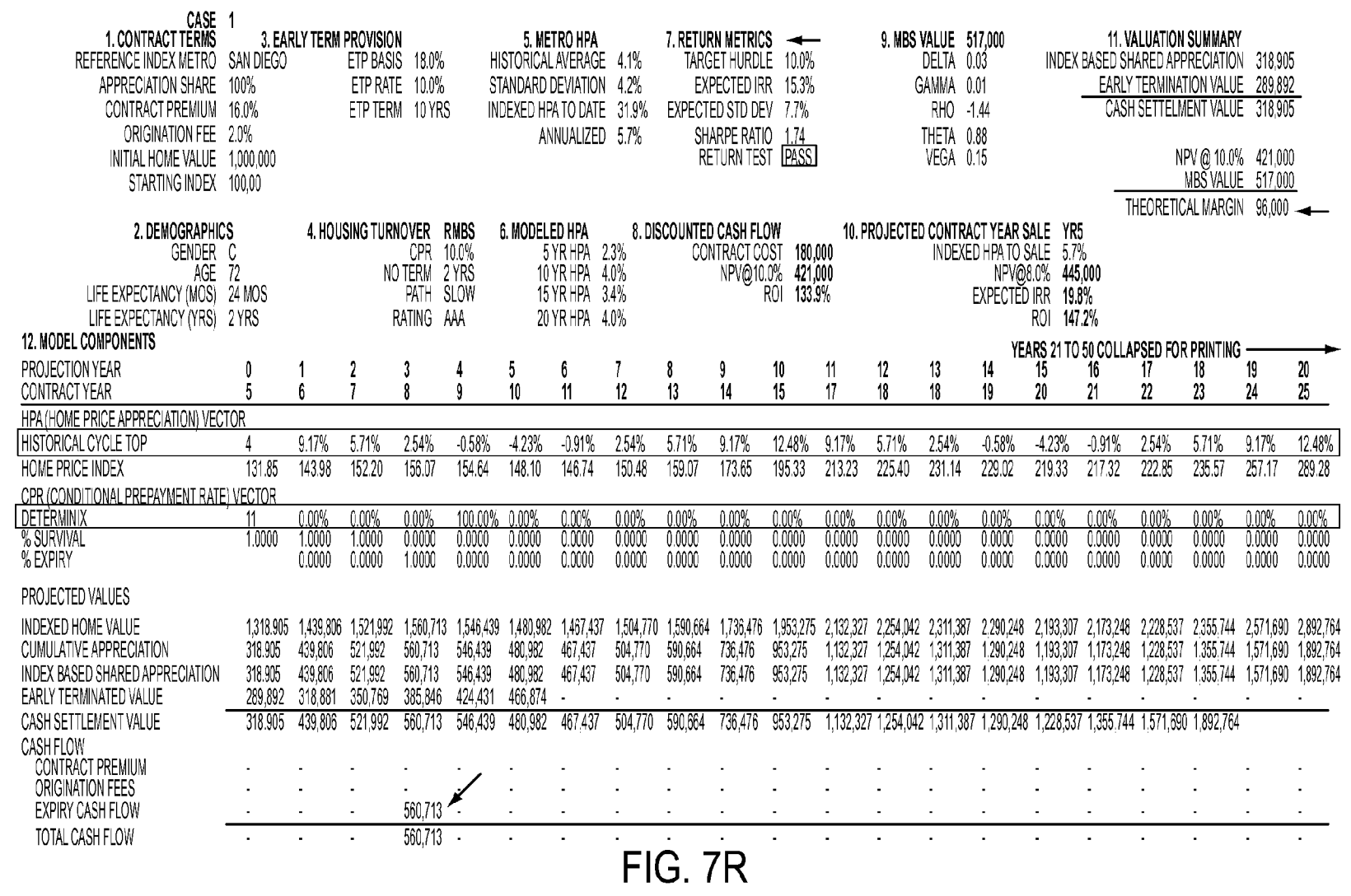
Figure 7S:
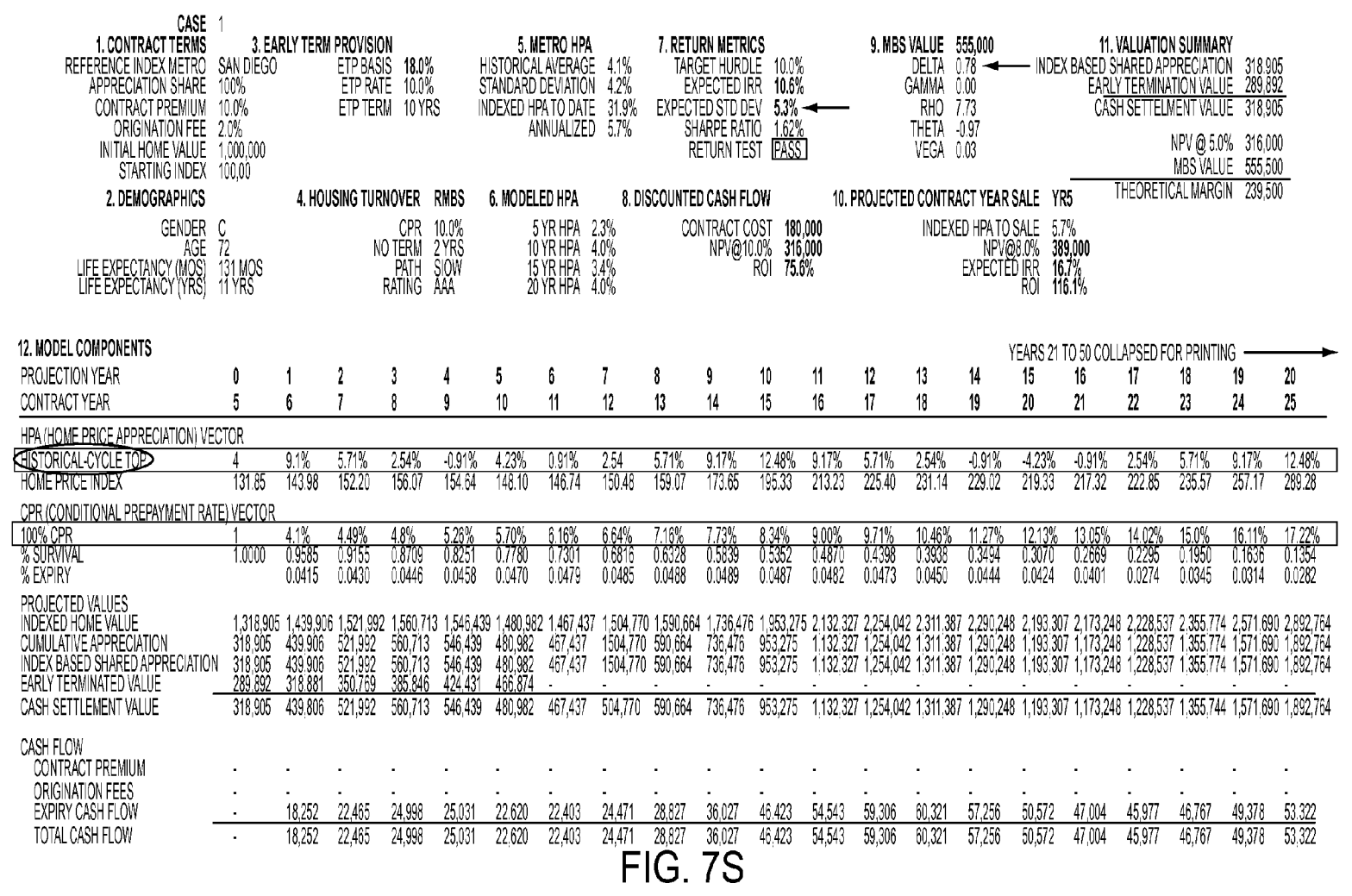
Figure 7S:
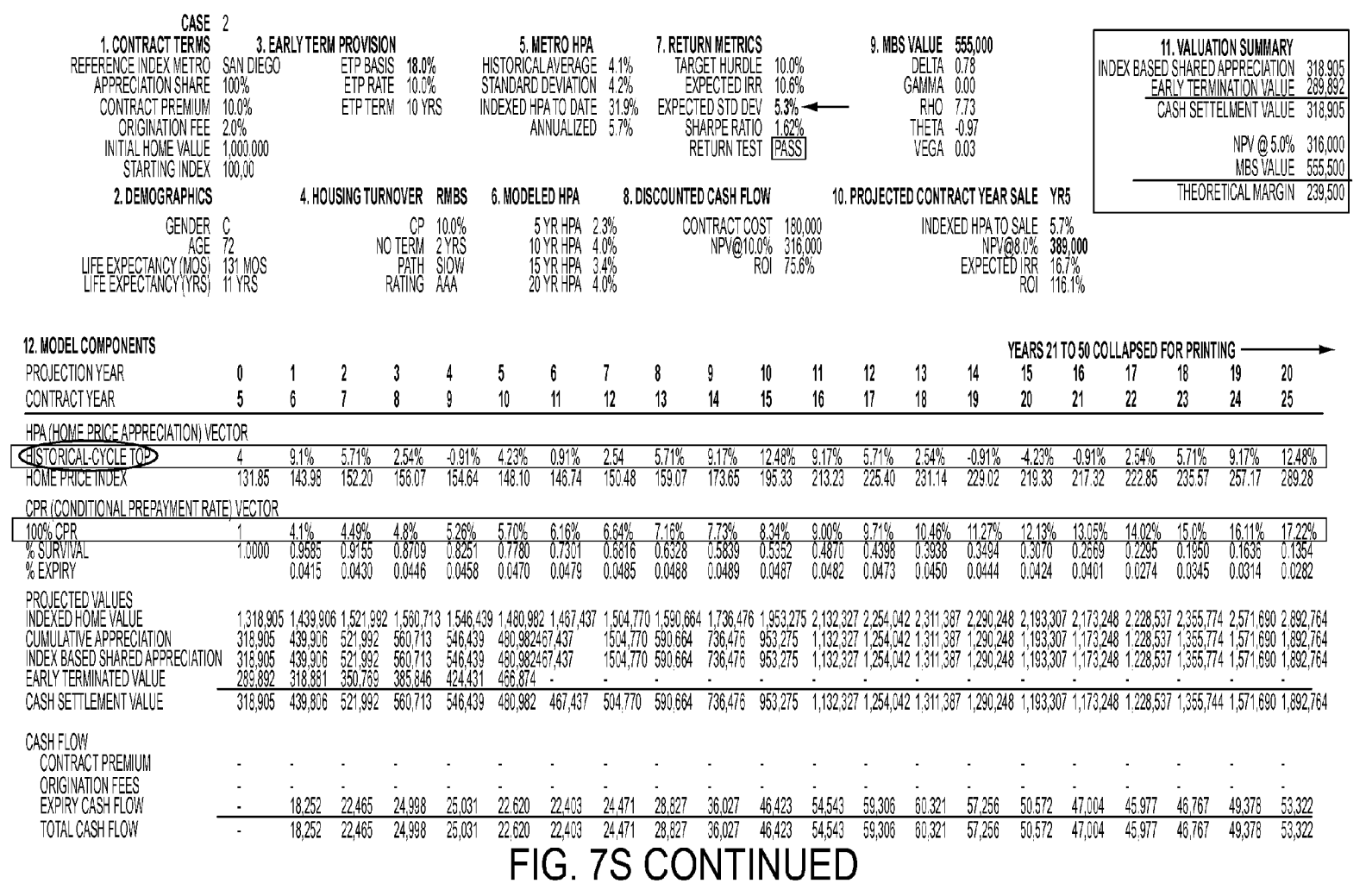

Three cases are described across multiple aspects of origination, in accordance with some implementations. These cases are not intended to be limiting, but rather merely illustrate applications of exemplary implementations. Case 1 illustrates an approved contract and the valuation review applied. Case 2 illustrates Flexible Pricing where proposed contract terms are customized in order to receive approval. Case 3 illustrates an application decline due to insufficient economics. FIGS. 7A-7S provide exemplary information associated with these three cases.

In Case 1, a retired couple in San Diego, Calif. wishes to sell 100% of the future appreciation in their home for cash. They are on a fixed income and expect to be living in their home for at least ten years. They will be using the cash to purchase long-term care coverage. Their two children are grown with families and homes of their own out of state. The couple would like to retain the equity in their home and avoid loan payments based on their income status. They would like to fund their grandchildren's education with any remaining proceeds from the sale of the home after their death or incapacitation. Property metrics include: location—San Diego; appraised value—$1,000,000; and/or other property metrics. Homeowner demographics include: gender—couple; age youngest—72 years old; and/or other homeowner demographics.

A private investment fund is looking for access to residential real estate appreciation as an asset uncorrelated to their current portfolio. They currently believe the U.S. market is near the bottom. They have a target return (IRR) of 10%, a tolerance for a 5% return in a down market and a minimal loss of capital and no gain in a severe market.

The proposed contract terms and homeowner demographics are entered into the system processor. The contract premium is set at 16% of home value, the current maximum available. The Early Termination Provision is the contract cost (16%+2% origination fee) accreting at 10% per annum for a term of 10 years. Based on location, the property is linked to the S&P® San Diego Case-Shiller Index® to track future growth. The system pulls expected, stressed and severe stress HPA and CPR vectors and uses an algorithm to calculate cash flow.

In an expected scenario, with an expectation of long-term mean reversion of real estate markets, the investor entity sets the expected Home Price Appreciation Vector to equal historical performance. They want to view projected returns using both a linear and sinusoidal (cyclical) projection based on historical mean and standard deviation. Based on expected property values (larger than properties considered for smaller or conforming reverse mortgages) and homeowner age demographics, the investor entity selects a Non-Conforming (Jumbo) Reverse Mortgage Prepayment table. Based on these parameters and Linear HPA, the model projects a 10.0% investor IRR resulting in a Return Test of "Pass". The Historical-Cyclical HPA starting at the bottom projects a 10.6% IRR. As an additional hurdle, the investor entity also wishes to assess Theoretical Margin ("TM") for the purpose of approving a deal and in this case requires at least $100,000 of TM. The model in this case outputs a Theoretical Margin of $135,000 determined via stochastic partial differential equation, also resulting in a Return Test of "Pass".

In a stressed scenario, the Stressed HPA Vector for San Diego is set at 50% of historical average with a target IRR of 5%. Under this scenario the buyer wants to test various projections and the resulting IRR. An example of Stressed Linear HPA (50% of Historical) with normal prepayments, with IRR=5.7%, is discussed below. An example of Stressed Cyclical from the bottom with normal prepayments, with IRR=5.9%, is discussed below. An example of Stressed Linear with no prepayments during ETP Term, IRR=5.1%, is discussed below. An example of Stressed Cyclical Bottom with no prepayments during ETP Term, with IRR=5.4%, is discussed below.

In a severe stress scenario, the Severe Stress HPA Vector is set to a 34.5% decline over 3 years followed by an annual rate of 3.23%. Again under this scenario the buyer wants to test multiple prepayment vectors. An example of normal prepayments, with IRR=1.0%, is discussed below. An example of no prepayment during ETP Term, with IRR=−0.2%, is discussed below. The investor entity may deem the risk to be minimal based on the low likelihood of the severe market decline and the expected IRR being within 20 basis points of target return.

Flexible pricing may be provided in some implementations. The contract may provide owner entities and investor entities customized contracts to negotiate and solve for mutually acceptable terms. By way of non-limiting example, the expected IRR may be 9.5%. Reducing Contract Premium to 14% may raise expected IRR to 10.1%, above the target ERR. If the investor entity's outlook changes, where they now view the U.S. residential real estate to be at the top of a market cycle, ETP could be modified (i.e., longer time period or increased accrual rate). This may discourage early prepayment and allow more time for the home to appreciate. By changing the HPA Vector to Historical Cycle Top, the expected IRR may drop from 10.1% to 9.7%. Conversely, an increase of ETP from 10 Years at 10% to 12 years at 12%, Expected IRR may increase to 10.0%. If the owner entity finds this too onerous, they could reduce the contract premium or withdraw the application. It may be this dynamic pricing that allows for custom contracts for both homeowner and counterparty, in some implementations.

Contract applications may be declined for one or more reasons. To illustrate, a property in the Detroit area is considered, with demographics otherwise similar to the San Diego or Seattle examples. Despite cutting the contract premium in half, the relatively poor historical performance of Detroit may result in an IRR that does not meet target. This case may be declined and may not be salvageable.

Figure 2C:
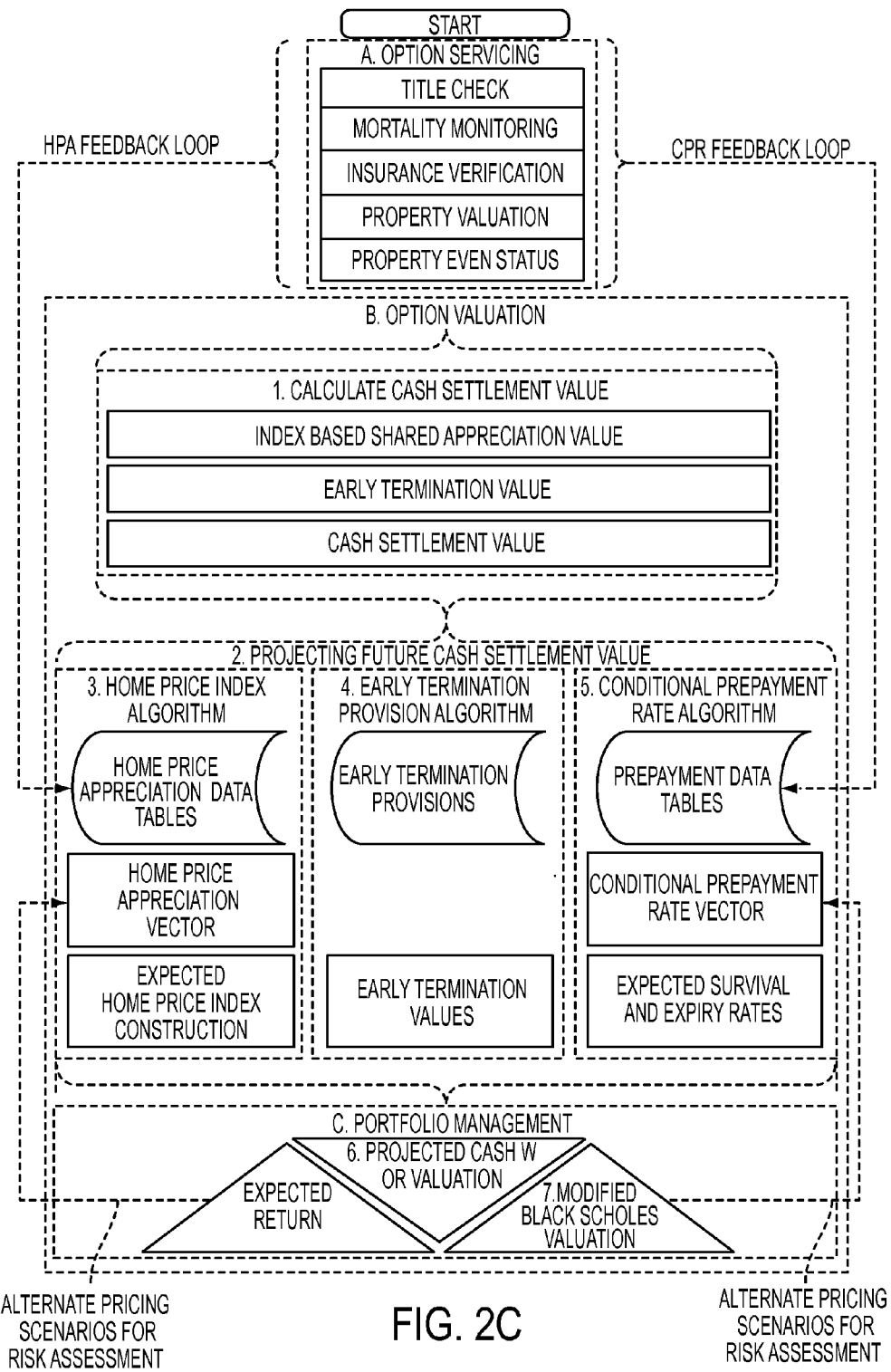
FIG. 2C illustrates an exemplary management and/or monitoring procedure with the valuation procedure of FIG. 2A, in accordance with one or more implementations.

Once the contract has been originated, the model may be used within a process that includes one or more of servicing, contract valuation, portfolio management, and/or other components. FIG. 2C illustrates an exemplary management and/or monitoring procedure with the valuation procedure of FIG. 2A, in accordance with one or more implementations. Servicing may include monitoring the underlying property assets through periodic title checks, insurance verification, property valuation and property tax status. Servicing data may be part of a feedback loop used to build, validate or update modeling components inclusive of, but not exclusive to, home price appreciation and prepayment rate vectors. Contract valuation may be calculated within the model. Contract valuation may provide valuation metrics, which may include one or more of indexed based appreciation, early termination value, cash settlement value, discounted cash flow value, and/or other valuation metrics. Portfolio management is an extension of the modeling process which includes portfolio aggregated values, cash management, risk management and portfolio optimization.

Managing the contract may include monitoring the underlying property assets. Through various reporting agencies and outside vendors, periodic checks may be conducted on contract properties. Checks may include, but are not exclusive to, transfer of titles, property listing (for sale), mortality events, insurance verification, property valuation, property lien status, and/or other actions. In some implementations, transfer of title through a mortality event or property sale may be termination triggers. A termination trigger may begin a process for collection of settlement value. Timing and trigger type (e.g., mortality or sale) may be tracked, and may be processed to measure against expected Conditional Prepayment Rates. This data may be used to track expected prepayments (e.g., initial CPR tables) versus actual prepayments. Statistically significant data may be used to update prepayment rates used in valuation and origination embodiments. For example, if actual mortality is observed at a lower rate than expected, expectations may be modified to conform with portfolio experience. Insurance and lien status checks may be conducted to ensure the underlying property is in good order and not subjected to technical triggers such as not maintaining proper insurance and property taxes. Any technical default trigger may initiate a review process, according to some implementations. Property valuation, whether through formal appraisals or automated valuation models ("AVMs") may be used to: 1) measure tracking error of the property to the index (i.e., whether or not the actual value of the property is conforming to expectations set by the movement in the index); 2) monitor home prices to possibly influence expectations of home price appreciation (HPA vectors); and/or for other purposes. Measuring tracking error may assist in monitoring basis risk or the risk associated with the underlying asset not performing to the level of the index. For example, a property that significantly underperforms its measuring index and is encumbered by a pre-existing loan may ultimately not yield sufficient proceeds to pay the cash settlement value as determined by the index. Monitoring home prices when combined with other macro-economic data such as the local affordability index may be used to shape future appreciation much in the way actual termination rates may shape and adjust expected terminations going forward. More specifically, this data may also be used to determine the market's position within the cycle of home price appreciation. Gathering, analyzing, and applying servicing data may provide a vital feedback loop to the valuation modeling process.

Valuation may be included in managing and/or monitoring the contracts. Valuing a contract or portfolio of contracts may be necessary for financial accounting, measuring performance, potential market sale, and/or other purposes. Exemplary methods for valuing a contract may include one or more of index based appreciation, early termination value, cash settlement value, discounted cash flow, partial differential functions, Modified Black Scholes, other forms of stochastic modeling, and/or other valuation methods. In some implementations, contract valuation may be completed through a series of algorithms starting with the shared index based appreciation and early termination value. Next cash settlement value may be determined as the greater of shared index based appreciation or early termination value. Cash settlement value may represent the contract's intrinsic value and the amount due to the investor entity if the contract expires on the projection date. Extrinsic value may be described as the quantified future value of the contract. The discounted cash flow method may do this by projecting cash flow from home price appreciation vector and prepayment rate vector.

Some implementation may relate to portfolio management. Portfolio management may include one or more of: 1) portfolio valuation; 2) cash management; 3) risk management; and/or other aspects of portfolio management. Portfolio valuation may be described as the aggregate value of portfolio contracts or a valuation derived from the expected portfolio cash flow as a whole. Cash management may be described as the tracking of sources and uses of cash. The primary sources of cash may include new capital and contract maturities resulting in cash settlements. Expected cash flow from contract expiry may be generated within the model using prepayment rates (e.g., CPRs) and any pertinent data from servicing (e.g., contract properties with sales pending, death notices, and/or other servicing data). The uses of cash may include, but not exclusive to, new contract origination, annuity payments, fees and expenses, and/or other uses of cash. New contract origination may be tracked through the sales pipeline and bank of approved contract terms. Annuity payments may be known from the portfolio of annuity contracts. Risk in the portfolio may be defined and quantified as the change in total value based on a change in input assumptions. For example, HPA risk or sensitivity to changes in home price appreciation may be determined by using the valuation model(s) to determine total change in value based on a 1% increase or decrease in HPA assumptions. Risk management subsequently may be the identification and mitigation of risk resulting in improved portfolio risk adjusted return. For example, valuation of the portfolio and analysis of sensitivity to various HPA shocks may show an undue concentration of risk around the San Francisco MSA. As a result, investors may decrease buying of that particular MSA (decrease premium and/or demand a greater return for contracts using that measuring index), or alternatively attempt to reduce total exposure to the San Francisco MSA through other financial instruments. Portfolio enhancements that may improve risk adjusted return may include one or more of geographical diversification, demographic diversification, contract type mix (e.g., lump sum versus annuity), and/or other enhancements. In an illiquid market for the contracts, portfolio enhancements may be limited to the origination phase of portfolio construction (i.e., the only way to change portfolio risk profile is to originate new, different contracts), whereas in a developed, liquid market, individual contracts may be bought and sold between investors.

By way of non-limiting illustration, a case is considered for the fifth contract year since origination. Real estate in San Diego has rebounded with the index growing at an annual rate of 5.7%. Macro-economic indicators suggest the area has reached the top of a cycle and will begin to slow within the near future. As a part of servicing the property, monitoring reports the following: no transfer of title through sale or death; no public sale listing; no reported death event; property insurance is in good standing; no additional liens on title; and property taxes have been paid. Based on the new real estate outlook, the valuation process may determine the following: Index Based Shared Appreciation is $318,905; Early Termination Value is $289,892; Cash Settlement Value $318,905; NPV @ 10.0% is $316,000; Modified Black-Sholes Value is 555,500; and Theoretical Margin is $239,500. The private investment fund updates their accounts with a value of $318,905 holding the asset at the Cash Settlement Value. This represents an unrealized gain of 77.2% or 12% annually. Based on the Modified Black-Scholes value of $555,500 there is still significant, potential gains within the contract. The Modified Black Scholes indicators show that the option is now behaving very similarly to the underlying index. The option exhibits a 78% delta, meaning for every 1% increase or decrease in the San Francisco index, the option MBS theoretical value will similarly increase or decrease in value by 78 basis points. Put differently, the option is behaving equivalently to an underlying index exposure of 78% of its face value (78% of $1 MM=$780,000). Because the portfolio is already heavily exposed to the San Francisco index, the manager decides to sell short a Case-Shiller/San Francisco future contract on the Chicago Mercantile Exchange, thus eliminating this contract's exposure to the San Francisco Index. Since the San Francisco index is currently at 148.1, the value of a CME contract is $37,025 ($250×index value). Using the model, the manager determines he must sell 21 contracts to ($780,000/37,025=21.06) to fully hedge this option's exposure to the index.

As another non-limiting illustration, a second case is considered for the fifth contract year. Real estate in Seattle has appreciated at 2% per year, well below historical average of 3.8%. A watch has been placed on the contract. The watch is triggered based on a risk to Early Termination Value. The contract is five years into the Early Termination Term with five years remaining. Based on the Prepayment Rate derived Survival Curve, the contract has a greater than 50% probability of surviving through the Early Termination Provision Term. The Early Termination Value in year 10 will reach $415,000. If the index appreciates at historical average or less for the remainder of the contracts, Shared Appreciation will not surpass ETV, resulting in a write-down in Cash Settlement Value (the greater of ETV or index-based appreciation) as soon as the early termination period expires in year 11. Macro-economic indicators still suggest the area is trending at the bottom of a market cycle. Property servicing reports everything is in good standing. Based on the new real estate outlook, the valuation process may determine the following: Index Based Shared Appreciation is $104,081; Early Termination Value is $257,682; Cash Settlement Value $257,682; NPV @10.0% is $156,000; Modified Black-Sholes Value is $367,000; and Theoretical Margin is $211,000. The private investment fund updates their accounts with a value of $257,682 holding the asset at the Cash Settlement Value. However, based on watch the fund has elected to book a reserve Cash Settlement Value (an as yet unrealized gain) bringing the net value down to $156,000, equivalent to the Net Present Value as determined by a discount rate of 10%. Collectively the two cases contribute $474,905 (318,905+156,000) to portfolio value and a probabilistic cash flow of $36 k (22,465+13,419) and $40 k (24,998+15,291) over the next two years.

Distribution may represent a phase of risk transference from an owner entity to the hold-to-maturity investor entity in one or more contracts. Distribution may be described as an aggregation and sale of contracts to individual investor entities or pooled groups of investor entities in a legal entity which may include a hierarchy or priority of capital flows and investor rights. The vehicle of distribution can take many forms. Examples of such forms may include one or more of a limited partnership, an offshore corporation, a private real estate investment trust or "REIT", a registered (public) non-traded REIT, a publicly offered and traded REIT, a structured product or securitization (e.g., securities offered by a bank written against the values and cash flows of a selected portfolio of contracts), and/or other forms of distribution vehicles.

Regardless of the final form, the same valuation models and processes for valuation via quantification of expected cash flows and risks thereof may be used to execute the distribution phase by placing a value on the portfolio of contracts as a whole. Put differently, valuation of a structure that houses a portfolio of contracts may be an extension of the valuation method for individual contracts; the same processes that are used to project and stress future cash flows may be used to rate and securitize a portfolio of contracts, in accordance with some implementations.

Capital structures may include, but are not exclusive to, pooled (equity) investment and (debt) securitization. A capital structure may be described as an assignation of the aggregated cash flows to different classes of investors within the pooled investment. Securitization may be described as the issuance of debt backed by a specific pool of assets. Debt may be structured or tranched in such a way as to further segment risk into different durations, risk levels, return types (e.g., fixed or variable, coupon or balloon, and/or other return types), and/or other segmentations. Segmentation may be achieved through the application of process instructions that designate the allocation of cash across the capital structure (a "waterfall"). Because debt lies above equity in the capital structure hierarchy, securitization may be used to provide lower risk access to riskier assets. Debt tranches may be listed and rated by a public rating agency, further lowering the perceived riskiness of the investment.

Figure 2D:
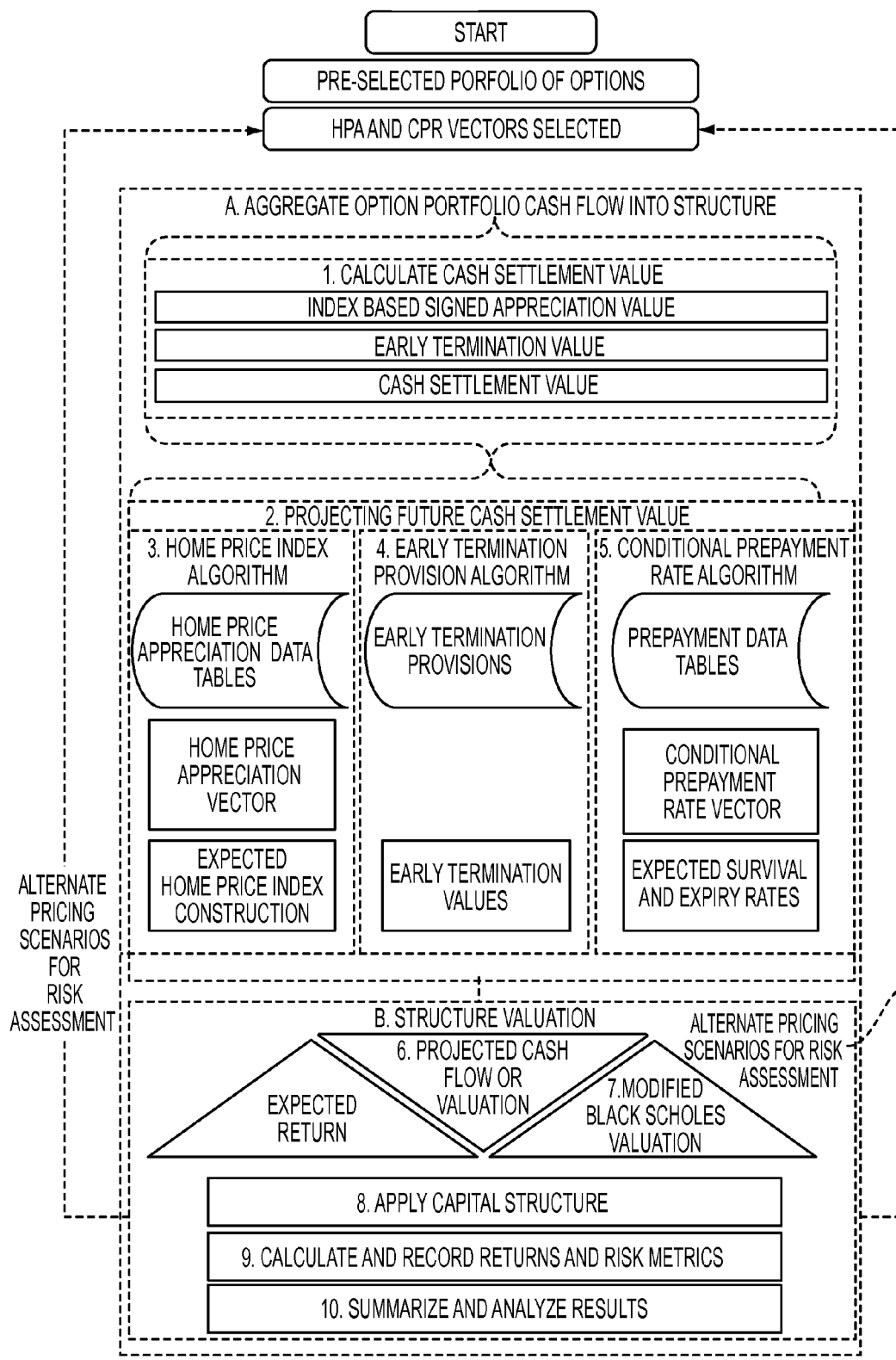
FIG. 2D illustrates an exemplary distribution procedure with the valuation procedure of FIG. 2A, in accordance with one or more implementations.

The contract valuation processes described herein may include cash flow aggregation and scenario testing. For structure valuation for the purpose of distribution (sale) and completion of risk transference, the process may be repeated with individual contract values and projected cash flows aggregated into portfolio values and cash flows. In the case of pooled investment vehicles, valuation processes described herein may be used to arrive at unit share price, initial public offering price, and/or other information associated with valuation. The projected portfolio cash flow may be passed through the capital structure; different components of the structure (equity vs. debt, debt of different seniority) yield risk/reward metrics and valuation specific to each component. FIG. 2D illustrates an exemplary distribution procedure with the valuation procedure of FIG. 2A, in accordance with one or more implementations.

A table or database of pre-selected contracts and their terms may be created for aggregation. The home price appreciation and conditional prepayment rate vectors may be selected based on the desired scenario. One-by-one contracts may be loaded into the processor along with the two vectors. Vectors may be probabilistic or deterministic applications. A series of processes and algorithms may determine individual values and projected cash flows. Individual contract value and projected cash flow may be aggregated into a portfolio cash flow and saved to a table or database.

A capital structure may be entered or loaded from a table or database into a processor. A capital structure may be described as a procedure or series of procedures which assigns cash flow to one or more capital debt and/or equity components. An algorithm processes the portfolio cash flow through the capital structure.

Return and risk metrics for individual capital structure components may be determined, and outputted or recorded to a table or database.

Once complete, another algorithm may summarize the series of results for individual capital structure components. Processor output may include, but is not limited to, mean return, return range, return variance, frequency of returns, return semi-deviation, number of defaults, and/or other output.

Distribution may be described as the monetization or sale of contracts from one investor entity or group of investor entities to another. Valuation for distribution may be aggregate value or cash flow for all contracts within a portfolio. Several scenarios may exist. For example, a first scenario may be the sale of contracts based on the net present value of future cash flow. A second scenario may be the sale of the portfolio based on current cash settlement value. A third scenario may be the transfer of contracts into a securitization vehicle.

In the first scenario, an offshore corporation in conjunction with an investment bank may purchase the portfolio and divide ownership amongst limited partners around aggregate cash settlement value.

In the second scenario, the portfolio may be bundled and sold into a non-traded REIT. The REIT would issue 10 million shares at $10.00 for a total market cap of $100 million. The $100 million may be divided pro rata across contracts based on the net present value of cash flows discounted at 10%. In the second scenario, the contract would represent 0.316% ($316 k/$100M) of portfolio value.

In the third scenario, a portfolio of contracts may be securitized via a structured product (rated bonds) offering which is purchased by a pension. A pension fund may seek exposure to U.S. residential real estate. The fund manager may like the collateralized indexation offered by the contracts described herein. However, the available capital may have a mandate to be invested in AA or better rated debt with a 30-year Treasury+200 point spread. Working with an investment bank and rating agencies, a private fund may submit the selected book of contracts to be structured for securitization. The rating agency may define various stress scenarios (e.g., HPA scenarios as well as termination rates such as stressed CPR). The portfolio may be modeled in line with the valuation process. A Monte Carlo simulation may establish a probability density function for dependent variables like prepayment rates. The expiry period may be determined by a random number generator and the % Survival Curve for the contract. A random number between 0 and 1 may be generated, and the best match may be located along the % Survival Curve. In the illustrated example, the random number generator may pick a number along the % Survival Curve that corresponds to projected year 3 or contract year 8. For this simulation run, the contract may contribute $560,713 to the portfolio cash flow, three years from the projection date. The aggregate cash flow streams maybe processed through a capital structure designed to maximize the size of the AA rated tranche.

When complete, the private fund may sell the portfolio into a trust. The portfolio may be partitioned into two debt tranches and one equity pool. The two debt tranches may be issued ratings of AA and BBB. The pension fund may buy the AA rated tranche from the trust. The BBB tranche may be sold to another fund. The private fund may retain the equity pool and sell the contracts into the trust at a price equal to a net present value derived via an 8% discount rate. Reviewing Case I, the contract may be originated for $180,000 and sold into the trust for $389,000 or the NPV @ 8% price. The private fund may earn 116.1% ROI or 16.7% IRR. The owner entity may use the $180,000 to secure Long-Term Care insurance while comfortably remaining in their home.

Figure 8A:
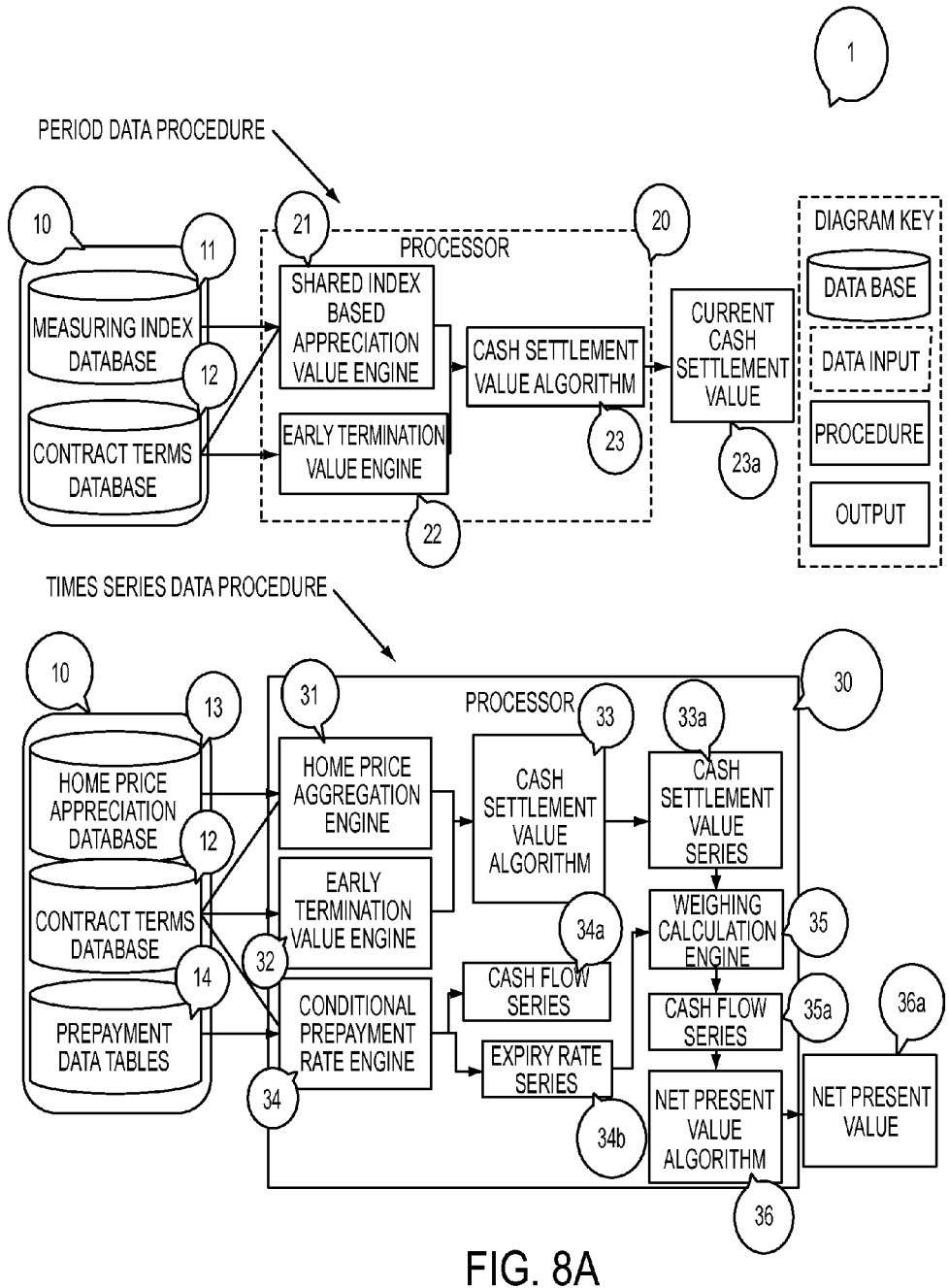
FIG. 8A illustrates an exemplary period data procedure and an exemplary time series data procedure, in accordance with one or more implementations.

FIG. 8A illustrates an exemplary period data procedure and an exemplary time series data procedure, in accordance with one or more implementations. In the period data procedure, processor 20 may include one or more of a Shared index Based Appreciation Value engine 21, Early Termination Value engine 22, a Cash Settlement Value algorithm 23, and/or other components. The Shared Index Based Appreciation Value engine 21 may receive inputs from the Measuring Index database 11 and Contract Terms database 12. The Shared Index Based Appreciation Value engine 21 may determine the contractual shared appreciation value based on the measuring index. The Early Termination Value engine 22 may determine the Early Termination Value based on the Early Termination Provision inputs pulled from the Contract Terms. The Early Termination Provision may be a schedule of specific amounts or be an accretion model associated with a base amount. A more complete explanation of the Early Termination Provision may be found herein.

The Cash Settlement algorithm 23 may determine the Current Cash Settlement Value 23a as the greater of Shared Index Based Appreciation or Early Termination Value for the current period.

In the time series data procedure, processor 30 may include one or more of a Home Price Appreciation engine 31, Early Termination Value engine 32, Cash Settlement Value algorithm 33, Conditional Prepayment Rate engine 34, Weighting Calculation engine 35, a Net Present Value algorithm 36, and/or other components. The Home Price Appreciation engine 31 may determine the Home Price Appreciation Vector and Projected Home Price Index for the projection horizon based on inputs received from the Home Price Appreciation Data tables 13 and Contract Terms database 14. The Early Termination Value engine 32 may determine the Early Termination Value series for the projection horizon based on the Early Termination Provision from the Contract Terms database 12. A series may be equal to a string of periods within the projection horizon, e.g., monthly for the next 30 years. The Cash Settlement Value algorithm 33 may determine the Cash Settlement Value series for each period within the projection horizon. Using inputs from the Contract Terms database 12 and Prepayment Data tables 14, the Conditional Prepayment Rate engine 34 may determine the percent Survival Rate Series 34a and Expiry Rate Series 34b. The Cash Settlement Value series 33a and Expiry Rate series 34b is fed into the Weighting Calculation engine 35 to determine the probability weighted Cash Flow series 35a. The Net Present Value algorithm 36 may determine the Net Present Value 36a from the Cash Flow series 35a.

Figure 8B:
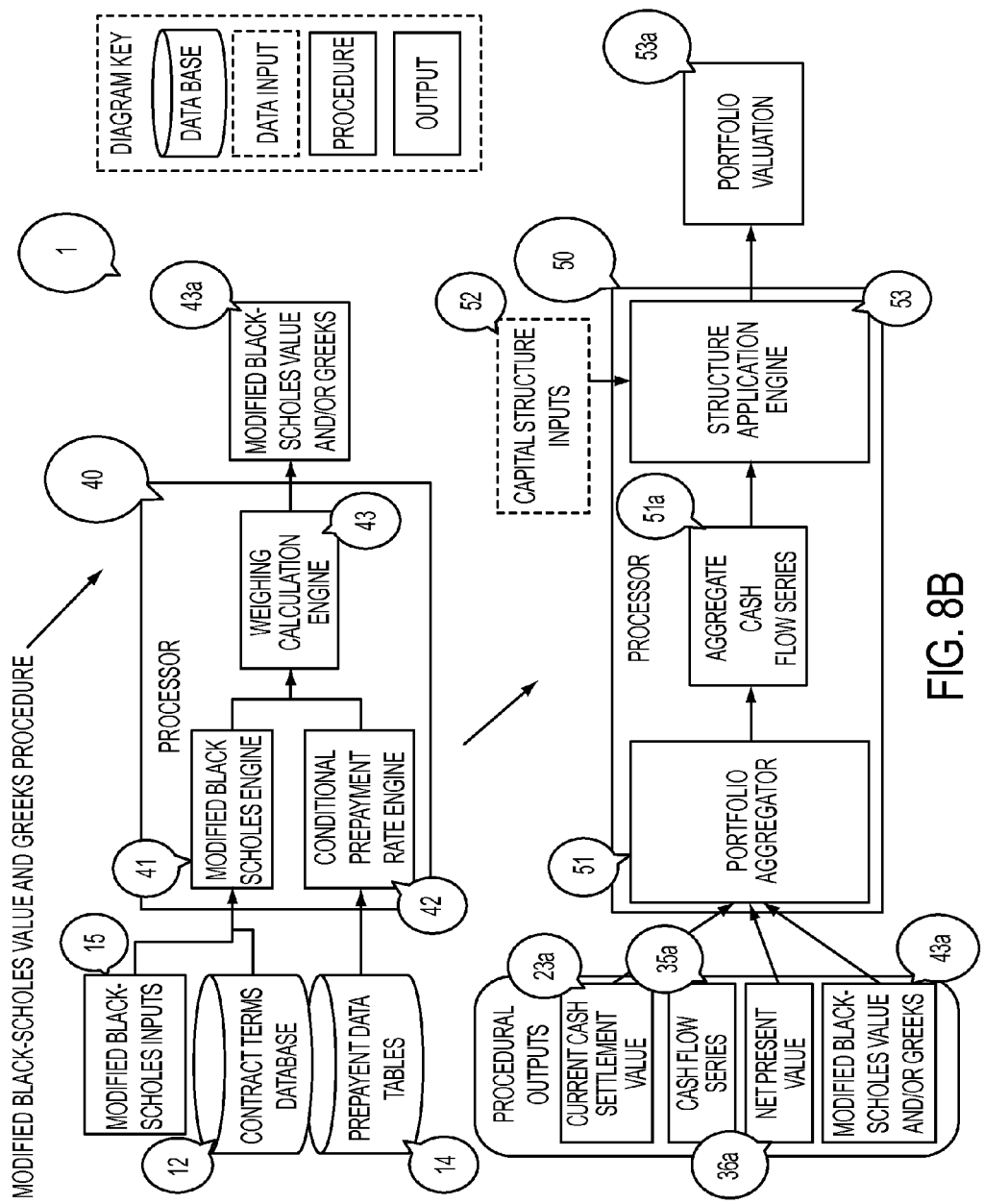
FIG. 8B illustrates an exemplary modified Black-Scholes value and Greeks procedure and an exemplary portfolio aggregation and value process, in accordance with one or more implementations.

FIG. 8B illustrates an exemplary modified Black-Scholes value and Greeks procedure and an exemplary portfolio aggregation and value process, in accordance with one or more implementations. In the modified Black-Scholes value and Greeks procedure, processor 40 may include one or more of a Modified Black-Scholes engine 41, Conditional Prepayment Rate engine 42, a Weighting Calculation engine 43, and/or other components. The Modified Black-Scholes engine 41 may determine the series MBS values from inputs 15 and contract terms pulled from the Contract Terms database 12.

Valuation and/or risk management may be based on a modified Black-Scholes model by replicating the contract(s) with standard puts and calls, according to some implementations. The Conditional Prepayment Rate engine 42 may pull data from the Prepayment Data tables 14 and feed the Expiry Rate Series into the Weighting Calculation engine 43. The Weighting Calculation engine may aggregate and may determine the Modified Black-Scholes Value and Greeks 43a.

In the portfolio aggregation and value procedure, processor 40 may include one or more of a Portfolio Aggregator 51, a Structure Application engine 53, and/or other components. The Portfolio Aggregator 51 may receive the Procedural Outputs (23a, 35a, 36a, 43a) from the procedures described above and aggregates the values and cash flow series. The Structure Application engine 53 may apply the Capital Structure 52 to the Aggregate Cash Flow series 51a to calculate the Portfolio Valuation 53a. The processors disclosed in connection with FIGS. 8A and 8B may be, at least partially, the same as or similar to processor(s) 124 (see FIG. 1), as described further herein.

In some implementations, server(s) 102, client computing platform(s) 104, and/or external resource(s) 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resource(s) 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resource(s) 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 120 may include sources of information, external entities participating with system 100, and/or other resources. In some implementations, some or all of the functionality attributed herein to external resource(s) 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more of virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 106, 108, 110, 112, 114, 116, 118, and/or other modules. Processor(s) 124 may be configured to execute modules 106, 108, 110, 112, 114, 116, 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116, and 118 are illustrated in FIG. 1 as being implemented within a single processing unit, in implementations in which processor(s) 124 includes multiple processing units, one or more of modules 106, 108, 110, 112, 114, 116, and/or 118 may be implemented remotely from the other modules. The description of the functionality provided by the different modules 106, 108, 110, 112, 114, 116, and/or 118 described below is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules 106, 108, 110, 112, 114, 116, and/or 118. As another example, processor(s) 124 may be configured to execute one or more additional modules that may perform some or all of the functionality attributed below to one of modules 106, 108, 110, 112, 114, 116, and/or 118.

Figure 9:
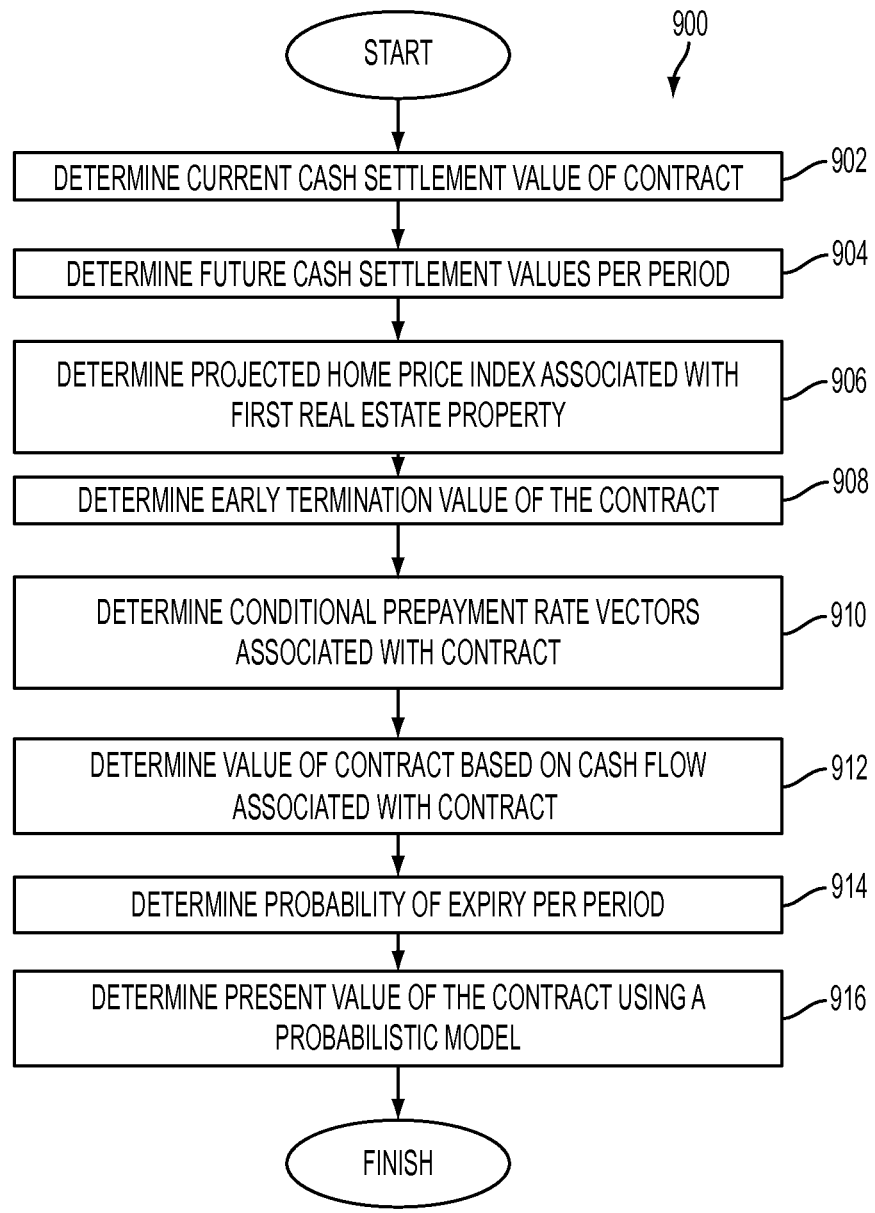
FIG. 9 illustrates a method for real estate risk transference via a contract by which conveys an economic right to a portion of future appreciation of real estate property, in accordance with one or more implementations.

FIG. 9 illustrates a method 900 for real estate risk transference via a contract by which conveys an economic right to a portion of future appreciation of real estate property, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, a current cash settlement value of the contract may be determined. The cash settlement value may be an amount due to the investor entity responsive to the contract being expired. Operation 902 may be performed by one or more processors configured to execute a current-cash-settlement-valuation module that is the same as or similar to current-cash-settlement-valuation module 106, in accordance with one or more implementations.

At an operation 904, future cash settlement values per period may be determined based on one or more of a term of the contract, an appreciation projection associated with the first real estate property, or a conditional prepayment rate vector. Operation 904 may be performed by one or more processors configured to execute a periodic-cash-settlement-value-projection module that is the same as or similar to periodic-cash-settlement-value-projection module 108, in accordance with one or more implementations.

At an operation 906, a projected home price index associated with the first real estate property may be determined based on one or more home price appreciation vectors. The projected home price index may describe appreciation of the first real estate property between a projection date and a contract termination date. A given home price appreciation vector may represent a forecast scenario of an outcome of appreciation of the first real estate property. Operation 906 may be performed by one or more processors configured to execute a projected-home-price-index-construction module that is the same as or similar to projected-home-price-index-construction module 110, in accordance with one or more implementations.

At an operation 908, an early termination value of the contract may be determined. The early termination value may describe an amount due to the investor entity in the event that the contract is terminated during an early termination period set forth in the contract. The early termination value may be the greater of a participation share of appreciation or an early termination amount set forth in the contract. Operation 908 may be performed by one or more processors configured to execute an early-termination-value-determination module that is the same as or similar to early-termination-value-determination module 112, in accordance with one or more implementations.

At an operation 910, conditional prepayment rate vectors associated with the contract may be determined. A given conditional prepayment rate vector may represent a prepayment scenario based on a statistical likelihood the contract will terminate within a given period. Operation 910 may be performed by one or more processors configured to execute a conditional-prepayment-rate-vector-determination module that is the same as or similar to conditional-prepayment-rate-vector-determination module 114, in accordance with one or more implementations.

At an operation 912, a value of the contract may be determined based on cash flow associated with the contract. The value may be determined by summing discounted projected cash flows for future periods. A given projected cash flow for a given period may be the greater of the shared home price appreciation and the early termination value, multiplied by the conditional prepayment rate, where the shared home price appreciation equals period home price index divided by the starting home price index multiplied by the initial home value. Operation 912 may be performed by one or more processors configured to execute a projected-cash-flow-contract-valuation module that is the same as or similar to projected-cash-flow-contract-valuation module 116, in accordance with one or more implementations.

At an operation 914, a probability of expiry per period may be determined. A given probability of expiry for a corresponding period may be based on a probability of a transfer of title of the first real estate property during the corresponding period. Transfer of title may be effected by either a sale by the owner entity of the first real estate property or death of the owner entity. Operation 914 may be performed by one or more processors configured to execute a stochastic-PDE-contract-valuation module that is the same as or similar to stochastic-PDE-contract-valuation module 118, in accordance with one or more implementations.

At an operation 916, a present value of the contract may be determined using a probabilistic model based on the future cash settlement values for periodic expiries, and the probabilities of expiry for corresponding periods. Operation 916 may be performed by one or more processors configured to execute a stochastic-PDE-contract-valuation module that is the same as or similar to stochastic-P DE-contract-valuation module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for real estate risk transference via a contract associated with a first real estate property, the contract being an asset-backed index swap or an investment contract in which an owner entity of the first real estate property grants to an investor entity an economic right to a portion of future appreciation of the first real estate property in exchange for consideration, the contract expiring responsive to a transfer of title of the first real estate property, the system comprising:

one or more processors configured to execute computer program modules, the computer program modules comprising:

a periodic-cash-settlement-value-projection module configured to determine future cash settlement values of expiry per period for a plurality of periods based on information received by the one or more processors, the received information including one or more of a term of the contract, an appreciation projection associated with the first real estate property, or a conditional prepayment rate vector; and a stochastic-partial-differential-equation-contract-valuation module configured to:

determine a probability of expiry per period for the plurality of periods, a given probability of expiry for a corresponding period being based on a probability of a transfer of title of the first real estate property during the corresponding period, transfer of title being effected by either a sale by the owner entity of the first real estate property or death of the owner entity; and determine a present value of the contract using a probabilistic model based on the future cash settlement values for periodic expiries, and the probabilities of expiry for corresponding periods;

wherein the present value of the contract is outputted by the one or more processors for use by the investor entity as a basis for the consideration to obtain the economic right to the portion of future appreciation of the first real estate property.

2. The system of claim 1, wherein the first real estate property is a residential real estate property or a buildable lot.

3. The system of claim 1, wherein the computer program modules further comprise a current-cash-settlement-valuation module configured to determine a current cash settlement value of the contract, the cash settlement value being an amount due to the investor entity responsive to the contract being expired.

4. The system of claim 3, wherein the cash settlement value is equal to the greater of a shared index appreciation and an early termination value.

5. The system of claim 4, wherein the shared index appreciation is a contractual appreciation share multiplied by a change in a designated index multiplied by an initial value of the first real estate property, the appreciation share being an amount of future appreciation conveyed by the contract, the designated index being an index that measures prices of residential housing, the initial value being the value of the first real estate property when the contract is initially placed into force.

6. The system of claim 4, wherein the early termination value is determined based on an early termination provision, the early termination provision designating either a set schedule or an accretion model with a base amount plus an annual rate of return for a duration of an early termination period.

7. The system of claim 6, wherein the base amount is a total contract cost to an investor associated with the contract.

8. The system of claim 6, wherein, under the set schedule, the early termination value is determined from a table via a look-up based on an age of the contract.

9. The system of claim 1, wherein the cash settlement value for each projected period is the greater of a shared index appreciation or an early termination value, the shared index appreciation is a contractual appreciation share, the early termination value being an amount owed to the investor entity responsive to the contract expiring during an early termination period stipulated in the contracts.

10. The system of claim 1, wherein the period of determined future cash settlement values is daily, monthly, or yearly.

11. The system of claim 1, wherein the computer program modules further comprise a projected-home-price-index-construction module configured to determine a projected home price index associated with the first real estate property based on one or more home price appreciation vectors, the projected home price index describing appreciation of the first real estate property between a projection date and a contract termination date, a given home price appreciation vector representing a forecast scenario of an outcome of appreciation of the first real estate property.

12. The system of claim 11, wherein a starting point of the projected home price index is equal to a current designated index value divided by a contact starting index multiplied by one hundred.

13. The system of claim 11, wherein the outcome resulting in an early termination of the contract is an expected outcome, a stressed outcome, or a situational outcome.

14. The system of claim 11, wherein the given home price appreciation vector accounts for one or more of historical index performance, macro-economic factors, or local market demographics.

15. The system of claim 11, wherein the given home price appreciation vector includes one or more of a linear function, a parabolic function, a polynomial function, a sinusoidal function, or a stochastic function.

16. The system of claim 1, wherein the computer program modules further comprise an early-termination-value-determination module configured to determine an early termination value of the contract, the early termination value being an amount due to the investor entity in the event that the contract is terminated during an early termination period set forth in the contract, the early termination value being the greater of a participation share of appreciation or an early termination amount set forth in the contract.

17. The system of claim 16, wherein the early termination value is zero in the event that the contract is terminated after the early termination period set forth in the contract.

18. The system of claim 1, wherein the computer program modules further comprise a conditional-prepayment-rate-vector-determination module configured to determine conditional prepayment rate vectors associated with the contract, a given conditional prepayment rate vector representing a prepayment scenario based on a statistical likelihood the contract will terminate within a given period.

19. The system of claim 18, wherein the given conditional prepayment rate vector is determined based on one or more of demographic information associated with the owner entity, home price index performance, a proximity to contract origination, an early termination provision, or model stressing.

20. The system of claim 18, wherein the given conditional prepayment rate vector is dynamic and changes over time.

21. The system of claim 1, wherein the computer program modules further comprise a projected-cash-flow-contract-valuation module configured to determine a value of the contract based on cash flow associated with the contract by summing discounted projected cash flows for future periods, a given projected cash flow for a given period being the greater of a shared home price appreciation and an early termination value, multiplied by the conditional prepayment rate vector, where the shared home price appreciation equals period home price index divided by a starting home price index multiplied by an initial home value.

22. The system of claim 21, wherein the given projected cash flow for the given period is discounted by a target return to arrive at a present value.

23. The system of claim 1, wherein the probabilistic model is a modified Black-Scholes model, the modified Black-Scholes model being a Black-Scholes model that is modified by (1) synthetically replicating the contract with commonplace contracts puts and calls, (2) solving for a value of the commonplace contracts puts and calls across all possible monthly expiries, and (3) multiplying the value of the commonplace contracts puts and calls by the conditional prepayment rate vector or a probability of expiry in individual periods.

24. A processor-implemented method for real estate risk transference via a contract associated with a first real estate property, the contract being an asset-backed index swap or an investment contract in which an owner entity of the first real estate property grants to an investor entity an economic right to a portion of future appreciation of the first real estate property in exchange for consideration, the contract expiring responsive to a transfer of title of the first real estate property, the method being performed by one or more processors configured to execute computer program instructions, the method comprising:
  determining, using one or more processors to execute a periodic-cash-settlement-value-projection module, future cash settlement values of expiry per period for a plurality of periods based on information received by the one or more processors, the received information including one or more of a term of the contract, an appreciation projection associated with the first real estate property, or a conditional prepayment rate vector; and
  determining, using one or more processors to execute a stochastic-partial-differential-equation-contract-valuation module, a probability of expiry per period for the plurality of periods, a given probability of expiry for a corresponding period being based on a probability of a transfer of title of the first real estate property during the corresponding period, transfer of title being effected by either a sale by the owner entity of the first real estate property or death of the owner entity;
  determining, using one or more processors to execute the stochastic-partial-differential-equation-contract-valuation module, a present value of the contract using a probabilistic model based on the future cash settlement values for periodic expiries, and the probabilities of expiry for corresponding periods; and
  outputting, using one or more processors, the present value of the contract for use by the investor entity as a basis for the consideration to obtain the economic right to the portion of future appreciation of the first real estate property.

25. The method of claim 24, wherein the first real estate property is a residential real estate property.

26. The method of claim 24, further comprising determining, using one or more processors, a current cash settlement value of the contract, the cash settlement value being an amount due to the investor entity responsive to the contract being expired.

27. The method of claim 24, further comprising determining, using one or more processors, a projected home price index associated with the first real estate property based on one or more home price appreciation vectors, the projected home price index describing appreciation of the first real estate property between a projection date and a contract termination date, a given home price appreciation vector representing a forecast scenario of an outcome of appreciation of the first real estate property.

28. The method of claim 24, further comprising determining, using one or more processors, an early termination value of the contract, the early termination value being an amount due to the investor entity in the event that the contract is terminated during an early termination period set forth in the contract, the early termination value being the greater of a participation share of appreciation or an early termination amount set forth in the contract.

29. The method of claim 24, further comprising determining, using one or more processors, conditional prepayment rate vectors associated with the contract, a given conditional prepayment rate vector representing a prepayment scenario based on a statistical likelihood the contract will terminate within a given period.

30. The method of claim 24, further comprising determining, using one or more processors, a value of the contract based on cash flow associated with the contract by summing discounted projected cash flows for future periods, a given projected cash flow for a given period being the greater of a shared home price appreciation and an early termination value, multiplied by the conditional prepayment rate vector, where the shared home price appreciation equals period home price index divided by a starting home price index multiplied by an initial home value.

* * * * *